(12) United States Patent
Maruta

(10) Patent No.: US 7,089,960 B2
(45) Date of Patent: Aug. 15, 2006

(54) BALL VALVE

(75) Inventor: Tomonori Maruta, Kakogawa (JP)

(73) Assignee: TLV Co. Ltd., Hyogo-Ken (JP)

(*) Notice: Subject to any disclaimer, the term of this patent is extended or adjusted under 35 U.S.C. 154(b) by 189 days.

(21) Appl. No.: 10/865,734

(22) Filed: Jun. 9, 2004

(65) Prior Publication Data

US 2004/0250862 A1     Dec. 16, 2004

(30) Foreign Application Priority Data

| Jun. 13, 2003 | (JP) | ............................. 2003-169317 |
| Jun. 13, 2003 | (JP) | ............................. 2003-169318 |
| Jun. 13, 2003 | (JP) | ............................. 2003-169319 |
| Dec. 15, 2003 | (JP) | ............................. 2003-416269 |
| Dec. 15, 2003 | (JP) | ............................. 2003-416270 |
| Dec. 15, 2003 | (JP) | ............................. 2003-416271 |

(51) Int. Cl.
    *B62D 5/083*   (2006.01)
(52) U.S. Cl. ............................. 137/625.22; 137/625.47
(58) Field of Classification Search ........... 137/625.21, 137/625.22, 625.47
    See application file for complete search history.

(56) References Cited

U.S. PATENT DOCUMENTS

| 1,336,970 A | * | 4/1920 | La Rue ....................... 137/314 |
| 1,350,517 A | * | 8/1920 | Pridgen ....................... 137/206 |
| 2,117,907 A | * | 5/1938 | Ogden ......................... 137/337 |
| 2,944,566 A | * | 7/1960 | Louis ....................... 137/625.22 |
| 3,186,436 A | * | 6/1965 | Louis ....................... 137/625.22 |
| 3,251,419 A | * | 5/1966 | Howard ........................... 169/9 |
| 3,333,813 A | * | 8/1967 | Rabe ........................... 251/172 |
| 3,349,799 A | * | 10/1967 | Mueller et al. ........ 137/625.22 |
| 3,464,449 A | * | 9/1969 | Morton .................. 137/625.24 |
| 3,596,680 A | * | 8/1971 | Adams ........................ 137/637 |
| 3,604,455 A | * | 9/1971 | Therneau ..................... 137/583 |
| 3,647,178 A | * | 3/1972 | Adams ........................ 251/148 |
| 3,674,052 A | * | 7/1972 | Hartman et al. ....... 137/625.21 |
| 3,770,016 A | * | 11/1973 | Johnstone et al. ..... 137/625.22 |
| 3,794,071 A | * | 2/1974 | Scott ..................... 137/599.18 |
| 3,834,372 A | * | 9/1974 | Turney ....................... 600/561 |
| 4,099,543 A | * | 7/1978 | Mong et al. ........... 137/625.22 |
| 4,125,128 A | * | 11/1978 | Elward et al. ............. 137/596 |
| 4,548,237 A | * | 10/1985 | Bogenschutz .......... 137/625.22 |
| 4,708,158 A | * | 11/1987 | Akamatsu ............. 137/315.19 |
| 4,756,479 A | * | 7/1988 | Lazenby, III ............... 239/110 |
| 4,806,258 A | * | 2/1989 | Duncan ....................... 210/423 |
| 5,052,657 A | * | 10/1991 | Winship ....................... 251/160 |
| 5,148,839 A | * | 9/1992 | Kirwan et al. ................. 141/1 |
| 5,255,706 A | * | 10/1993 | Chudakov ................. 137/637.3 |

(Continued)

FOREIGN PATENT DOCUMENTS

JP     59-188360     10/1984

*Primary Examiner*—John Fox
(74) *Attorney, Agent, or Firm*—Kenyon & Kenyon LLP

(57) ABSTRACT

The present invention is a ball valve which may be attached to a fluid pipe for connection/disconnection between an entrance and an exit. More particularly, the present invention is a ball valve having a discharge orifice communicating with ambient air in addition to the entrance and the exit for connection/disconnection between the entrance and the discharge orifice and/or between the exit and the discharge orifice. The ball valve of the present invention may be attached to piping systems such as, for example, the secondary side of a steam trap, which blocks steam but automatically discharges condensed water, and is used for checking a discharging state of the primary side steam trap and/or releasing remaining pressure on the secondary side.

17 Claims, 24 Drawing Sheets

U.S. PATENT DOCUMENTS

| | | | |
|---|---|---|---|
| 5,388,606 A * | 2/1995 | Banks | 137/38 |
| 5,413,309 A * | 5/1995 | Giesler | 251/149.9 |
| 5,632,294 A * | 5/1997 | Benton | 137/1 |
| 5,785,074 A * | 7/1998 | Kieper | 137/68.11 |
| 6,161,582 A * | 12/2000 | Asano et al. | 137/625.21 |
| 6,189,807 B1 * | 2/2001 | Miller et al. | 239/124 |
| 6,247,839 B1 * | 6/2001 | Kochanowicz et al. | 366/159.1 |
| 6,298,878 B1 * | 10/2001 | Asano et al. | 137/625.21 |
| 6,446,667 B1 * | 9/2002 | Wang | 137/625.22 |
| 6,540,206 B1 * | 4/2003 | Guerra | 251/288 |
| 6,832,621 B1 * | 12/2004 | Williams | 137/239 |

* cited by examiner

BALL VALVE

CROSS REFERENCE TO RELATED APPLICATIONS

The present invention claims priority to application Nos. 2003-169317, 2003-169318, and 2003-169319 filed in Japan on Jun. 13, 2003, and Application Nos. 2003-416269, 2003-416270, and 2003-416271 filed in Japan on Dec. 15, 2003 which are expressly incorporated herein in their entirety by reference thereto.

FIELD OF INVENTION

The present invention is an improved ball valve which, when placed in a piping system, is capable of discharging fluid outside of the piping system from upstream and/or downstream of the ball valve. A discharge orifice in the ball valve of the present invention communicates with ambient air and can be used to discharge liquid from the entrance or exit of the ball valve while the ball valve is closed and/or may be used to release remaining pressure at the ball valve's exit.

BACKGROUND OF THE INVENTION

A conventional ball valve is disclosed in, e.g., Japanese Published Unexamined Utility-Model Application No. Sho 59-188360. In the conventional ball valve, a valve chamber with entrance and exit communicating with each other in a casing is formed, a valve ball with a circulation hole is provided in the valve chamber, and an entrance-side ring valve seat is provided on the entrance side of the valve ball while an exit-side ring valve seat is provided on the exit side of the valve ball. The entrance and exit are connected or disconnected by rotating the valve ball with a valve shaft hermetically passing through the casing.

In the above-described conventional ball valve, the entrance and exit are connected/disconnected by rotate-operating the valve ball. However, the conventional ball valve lacks the capability of discharging fluid at its entrance from a discharge orifice communicating ambient air different from the entrance and exit, and/or releasing remaining pressure at its exit. For this reason, it is impossible to check the discharging state of a steam trap provided on the primary side and/or to release remaining pressure on the secondary side.

Accordingly, the purpose of the present invention is to provide a ball valve which enables the discharge of fluid in its entrance from a discharge orifice communicating ambient air different from the entrance and exit, and/or the release of remaining pressure in the exit side of the ball valve.

SUMMARY OF THE INVENTION

The present invention is a ball valve in which a valve chamber with an entrance and exit communicating with each other in a casing is formed, a valve ball with a circulation hole is provided in the valve chamber, an entrance-side ring valve seat is provided on the entrance side and an exit-side ring valve seat is provided on the exit side of the valve ball, the entrance and the exit are connected or disconnected by rotate-operating the valve ball with a valve shaft hermetically passing through the casing, wherein a through hole passing through from a valve ball contact surface to a casing contact surface is formed in the exit-side ring valve seat, and a discharge orifice with one end communicating the through hole of the exit-side ring valve seat and the other end communicating ambient air is formed, and wherein a first passage hole which connects the circulation hole with the entrance in a first disconnection state where the valve ball disconnects the entrance from the exit, and which connects the circulation hole with the exit in a second disconnection state where the valve ball is rotated by 180 degrees from the first disconnection state so as to disconnect the entrance from the exit, and a second passage hole which connects the circulation hole with the through hole in the first disconnection state and which is disconnected from the through hole in the exit-side ring valve seat in the second disconnection state, are formed in the valve ball.

The present invention is also a ball valve in which a valve chamber with an entrance and exit communicating with each other in a casing is formed, a valve ball with a circulation hole is provided in the valve chamber, an entrance-side ring valve seat is provided on the entrance side and an exit-side ring valve seat is provided on the exit side of the valve ball, the entrance and the exit are connected or disconnected by rotate-operating the valve ball with a valve shaft hermetically passing through the casing, wherein a through hole passing through from a valve ball contact surface to a casing contact surface is formed in the entrance-side ring valve seat, and a discharge orifice with one end communicating the through hole of the entrance-side ring valve seat and the other end communicating ambient air is formed, and wherein a first passage hole which connects the circulation hole with the entrance in a first disconnection state where the valve ball disconnects the entrance from the exit, and which connects the circulation hole with the exit in a second disconnection state where the valve ball is rotated by 180 degrees from the first disconnection state so as to disconnect the entrance from the exit, and a second passage hole which connects the circulation hole with the through hole in the first disconnection state and which is disconnected from the through hole in the entrance-side ring valve seat in the second disconnection state, are formed in the valve ball.

In the ball valve according to these example embodiments of the invention, in the first disconnection state where the valve ball is rotate-operated to disconnect the entrance from the exit, the entrance and the discharge orifice communicate with each other through the first passage hole, the circulation hole, the second passage hole and the through hole. In the second disconnection state where the valve ball is rotate-operated by 180 degrees from the first disconnection state, the entrance, the exit and the discharge orifice are disconnected. In these arrangements, fluid at the entrance can be discharged from the discharge orifice communicating ambient air different from the entrance and exit.

The present invention is also a ball valve in which a valve chamber with an entrance and exit communicating with each other in a casing is formed, a valve ball with a circulation hole is provided in the valve chamber, an entrance-side ring valve seat is provided on the entrance side and an exit-side ring valve seat is provided on the exit side of the valve ball, the entrance and the exit are connected or disconnected by rotate-operating the valve ball with a valve shaft hermetically passing through the casing, wherein a through hole passing through from a valve ball contact surface to a casing contact surface is formed in the exit-side ring valve seat, and a discharge orifice with one end communicating the through hole of the exit-side ring valve seat and the other end communicating ambient air is formed, and wherein a first passage hole which connects the circulation hole with the entrance in a first disconnection state where the valve ball disconnects the entrance from the exit, and which connects the circulation hole with the exit in a second disconnection state where the valve ball is rotated by 180 degrees from the first disconnection state so as to disconnect the entrance from the exit, and a third passage hole which connects the circulation hole with the through hole in the second disconnection state and which is disconnected from the through hole in the exit-side ring valve seat in the first disconnection state, are formed in the valve ball.

The present invention is also a ball valve in which a valve chamber with an entrance and exit communicating with each other in a casing is formed, a valve ball with a circulation hole is provided in the valve chamber, an entrance-side ring valve seat is provided on the entrance side and an exit-side ring valve seat is provided on the exit side of the valve ball, the entrance and the exit are connected or disconnected by rotate-operating the valve ball with a valve shaft hermetically passing through the casing, wherein a through hole passing through from a valve ball contact surface to a casing contact surface is formed in the entrance-side ring valve seat, and a discharge orifice with one end communicating the through hole of the entrance-side ring valve seat and the other end communicating ambient air is formed, and wherein a first passage hole which connects the circulation hole with the entrance in a first disconnection state where the valve ball disconnects the entrance from the exit, and which connects the circulation hole with the exit in a second disconnection state where the valve ball is rotated by 180 degrees from the first disconnection state so as to disconnect the entrance from the exit, and a third passage hole which connects the circulation hole with the through hole in the second disconnection state and which is disconnected from the through hole in the entrance-side ring valve seat in the first disconnection state, are formed in the valve ball.

In the ball valve according to these example embodiments of the present invention, in the first disconnection state where the valve ball is rotate-operated to disconnect the entrance from the exit, the entrance, the exit and the discharge orifice are disconnected. In the second disconnection state where the valve ball is rotate-operated by 180 degrees from the first disconnection state, the exit and the discharge orifice communicate with each other through the first passage hole, the circulation hole, the third passage hole and the through hole. In these arrangements, remaining pressure at the exit can be released from the discharge orifice communicating ambient air different from the entrance and exit.

The present invention is also a ball valve in which a valve chamber with an entrance and exit communicating with each other in a casing is formed, a valve ball with a circulation hole is provided in the valve chamber, an entrance-side ring valve seat is provided on the entrance side and an exit-side ring valve seat is provided on the exit side of the valve ball, the entrance and the exit are connected or disconnected by rotate-operating the valve ball with a valve shaft hermetically passing through the casing, wherein a through hole passing through from a valve ball contact surface to a casing contact surface is formed in the exit-side ring valve seat, and a discharge orifice with one end communicating the through hole of the exit-side ring valve seat and the other end communicating ambient air is formed, and wherein a first passage hole which connects the circulation hole with the entrance in a first disconnection state where the valve ball disconnects the entrance from the exit, and which connects the circulation hole with the exit in a second disconnection state where the valve ball is rotated by 180 degrees from the first disconnection state so as to disconnect the entrance from the exit, a second passage hole which connects the circulation hole with the through hole in the first disconnection state and which is disconnected from the through hole in the exit-side ring valve seat in the second disconnection state, and a third passage hole which connects the circulation hole with the through hole in the second disconnection state and which is disconnected from the through hole in the exit-side ring valve seat in the first disconnection state, are formed in the valve ball.

The present invention is also a ball valve in which a valve chamber with an entrance and exit communicating with each other in a casing is formed, a valve ball with a circulation hole is provided in the valve chamber, an entrance-side ring valve seat is provided on the entrance side and an exit-side ring valve seat is provided on the exit side of the valve ball, the entrance and the exit are connected or disconnected by rotate-operating the valve ball with a valve shaft hermetically passing through the casing, wherein a through hole passing through from a valve ball contact surface to a casing contact surface is formed in the entrance-side ring valve seat, and a discharge orifice with one end communicating the through hole of the entrance-side ring valve seat and the other end communicating ambient air is formed, and wherein a first passage hole which connects the circulation hole with the entrance in a first disconnection state where the valve ball disconnects the entrance from the exit, and which connects the circulation hole with the exit in a second disconnection state where the valve ball is rotated by 180 degrees from the first disconnection state so as to disconnect the entrance from the exit, a second passage hole which connects the circulation hole with the through hole in the first disconnection state and which is disconnected from the through hole in the entrance-side ring valve seat in the second disconnection state, and a third passage hole which connects the circulation hole with the through hole in the second disconnection state and which is disconnected from the through hole in the entrance-side ring valve seat in the first disconnection state, are formed in the valve ball.

In the ball valve according to these example embodiments of the present invention, in the first disconnection state where the valve ball is rotate-operated to disconnect the entrance from the exit, the entrance and the discharge orifice communicate with each other through the first passage hole, the circulation hole, the second passage hole and the through hole. In the second disconnection state where the valve ball is rotate-operated by 180 degrees from the first disconnection state, the exit and the discharge orifice communicate with each other through the first passage hole, the circulation hole, the third passage hole and the through hole. In these arrangements, fluid at the entrance can be discharged from the discharge orifice communicating ambient air different from the entrance and exit, and remaining pressure at the exit can be released from the discharge orifice.

DETAILED DESCRIPTION

Figure 1:
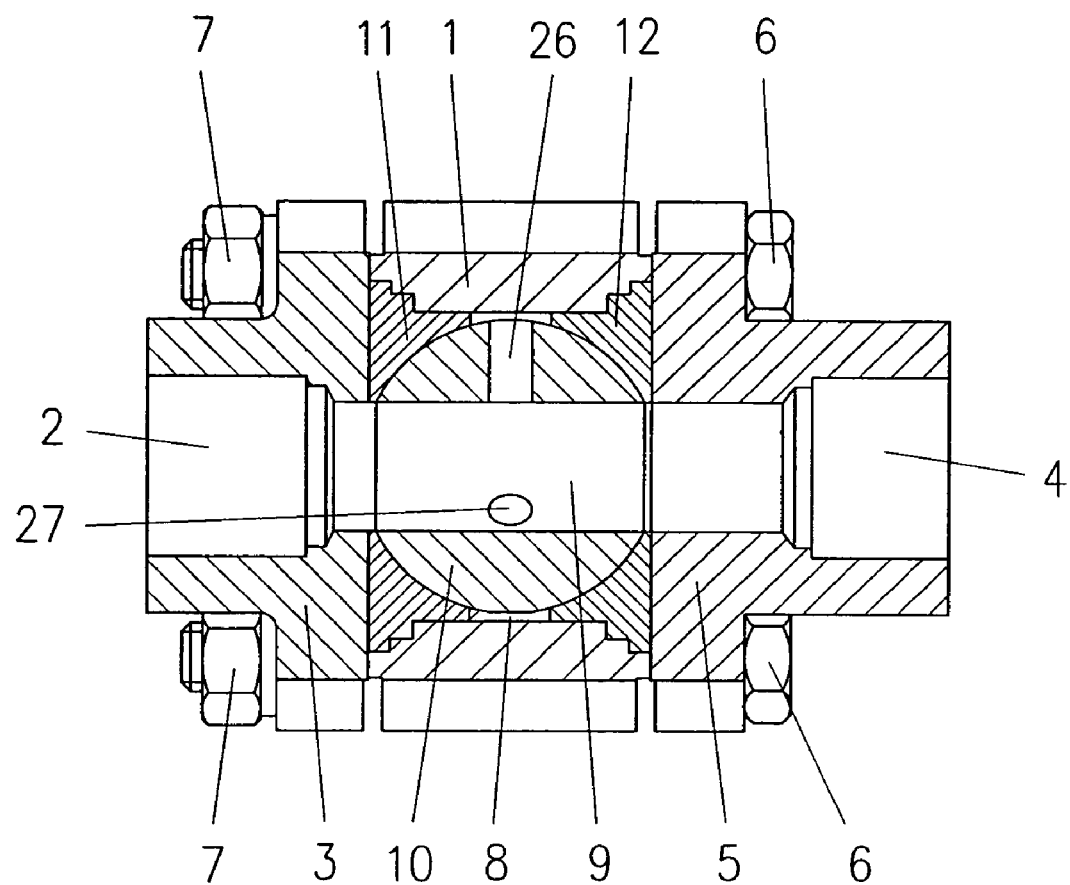
FIG. 1. is a transverse sectional view of the ball valve according to an example embodiment of the present invention.

An example embodiment of the invention is shown in FIGS. 1 to 4. A casing is formed by fastening an entrance side member 3 having an entrance 2 and an exit side member 5 having an exit 4 to a main body 1 with bolts 6 and nuts 7, and a valve chamber 8 where the entrance 2 and the exit 4 communicate with each other is formed in the casing.

A valve ball 10 where a circulation hole 9 is formed in a straight line in a horizontal direction is rotatably provided in the valve chamber 8. An entrance-side ring valve seat 11 is provided on the entrance 2 side of the valve ball 10, and an exit-side ring valve seat 12 is provided on the exit 4 side of the valve ball 10. The valve ball 10 has a parallel key groove 13 in its upper part, and a key member at a lower end of a valve shaft 14 passing through the main body 1 is engaged with the key groove. The valve shaft 14 holds airtightness with the main body 1 with a packing 15 and is fixed to the main body 1 with nuts 16. Reference numerals 17, 18, 19 and 20 denote washers; and 21, a packing holder. A handle 22 for rotation operation is fixed to the valve shaft 14 with nuts 23.

The exit-side ring valve seat 12 has a through hole 24 passing through from a contact surface of the valve ball 10 to a contact surface of the exit side member 5. The exit side member 5 has a discharge orifice 25 with one end communicating the through hole 24 of the exit-side ring valve seat 12 and the other end communicating ambient air. The through hole 24 is provided in a lower part of the exit-side ring valve seat 12 in parallel to a center line of the entrance 2 and the exit 4. The valve ball 10 has a first passage hole 26 which connects the circulation hole 9 with the entrance 2 in a first disconnection state where the valve ball 10 disconnects the entrance 2 from the exit 4, and which connects the circulation hole 9 with the exit 4 in a second disconnection state where the valve ball 10 is rotated by 180 degrees from the first disconnection state to disconnect the entrance 2 from the exit 4, and a second passage hole 27 which connects the circulation hole 9 with the through hole 24 in the first disconnection state and which is disconnected by the entrance-side ring valve seat 11 in the second disconnection state. The first passage hole 26 is provided in the horizontal direction at a right angle to the circulation hole 9, and its central axis passes through the center of the valve ball 10. The second passage hole 27 is provided downwardly by 45 degrees from the horizontal direction, and its central axis passes through the center of the valve ball 10.

Figure 2:
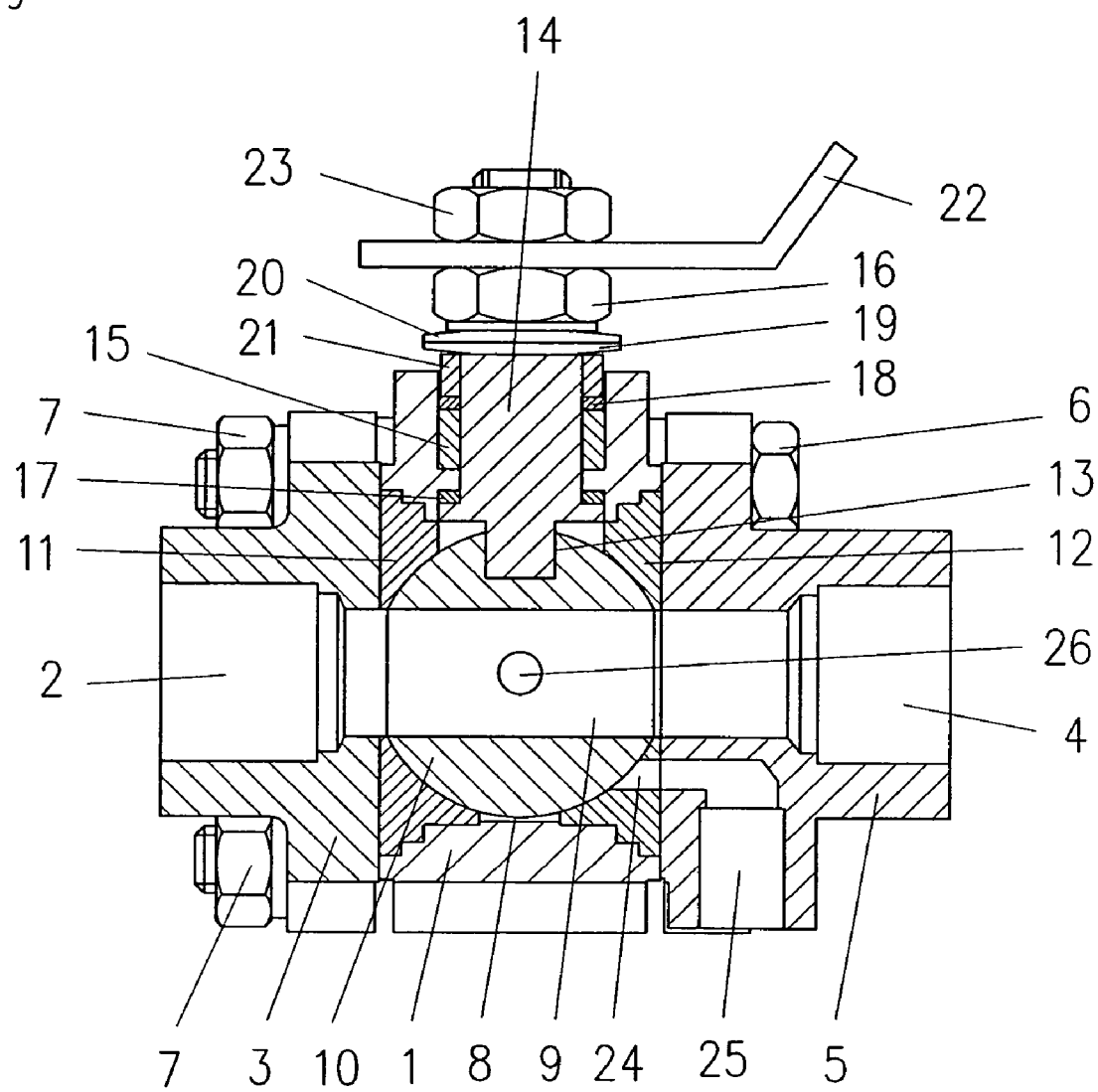
FIG. 2. is a central sectional view of FIG. 1.
Figure 3:
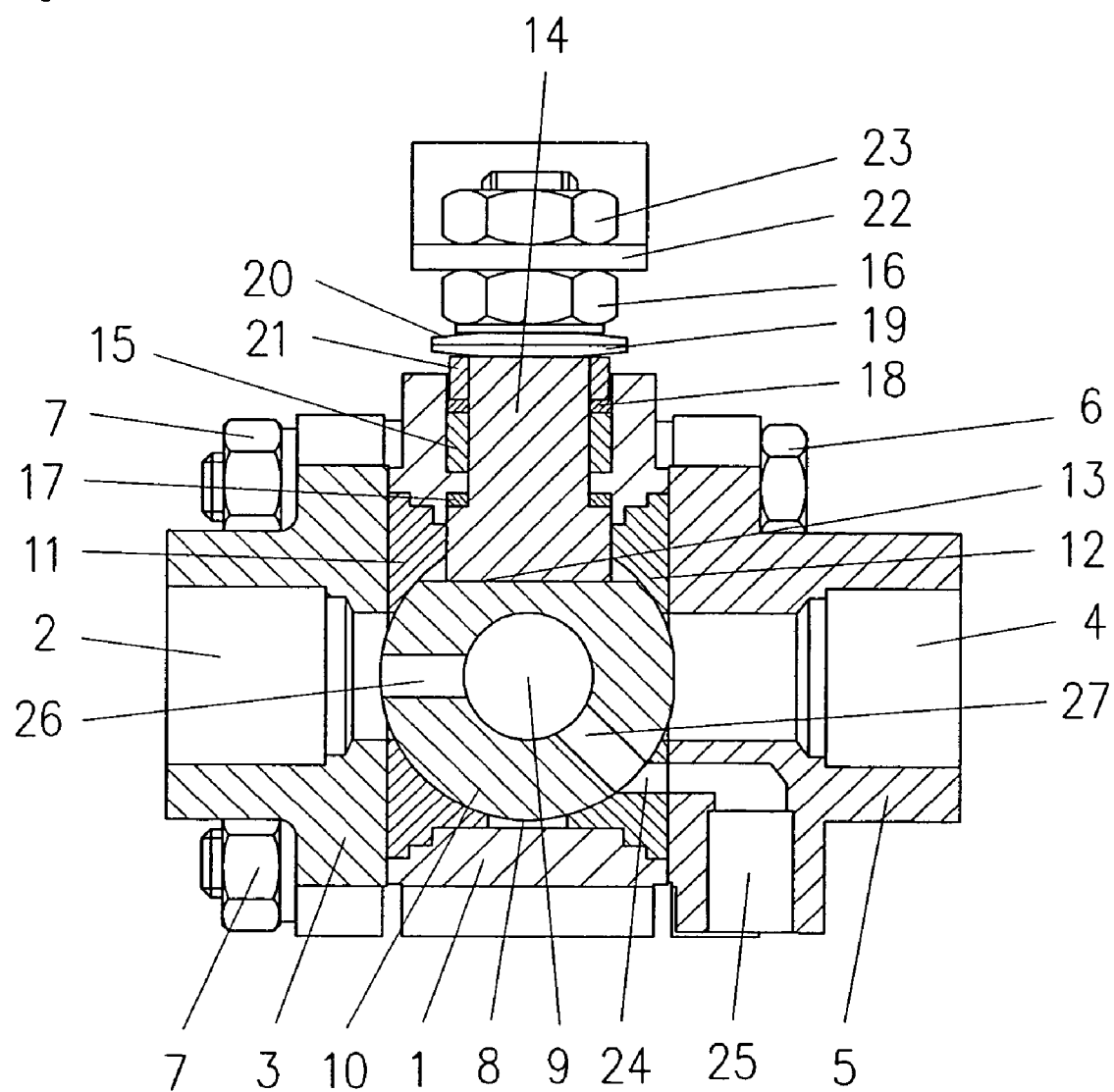
FIG. 3. is a central sectional view of FIG. 1 when the valve ball in FIG. 1 is rotated by 90 degrees in the counterclockwise direction to set the first disconnection state.
Figure 4:
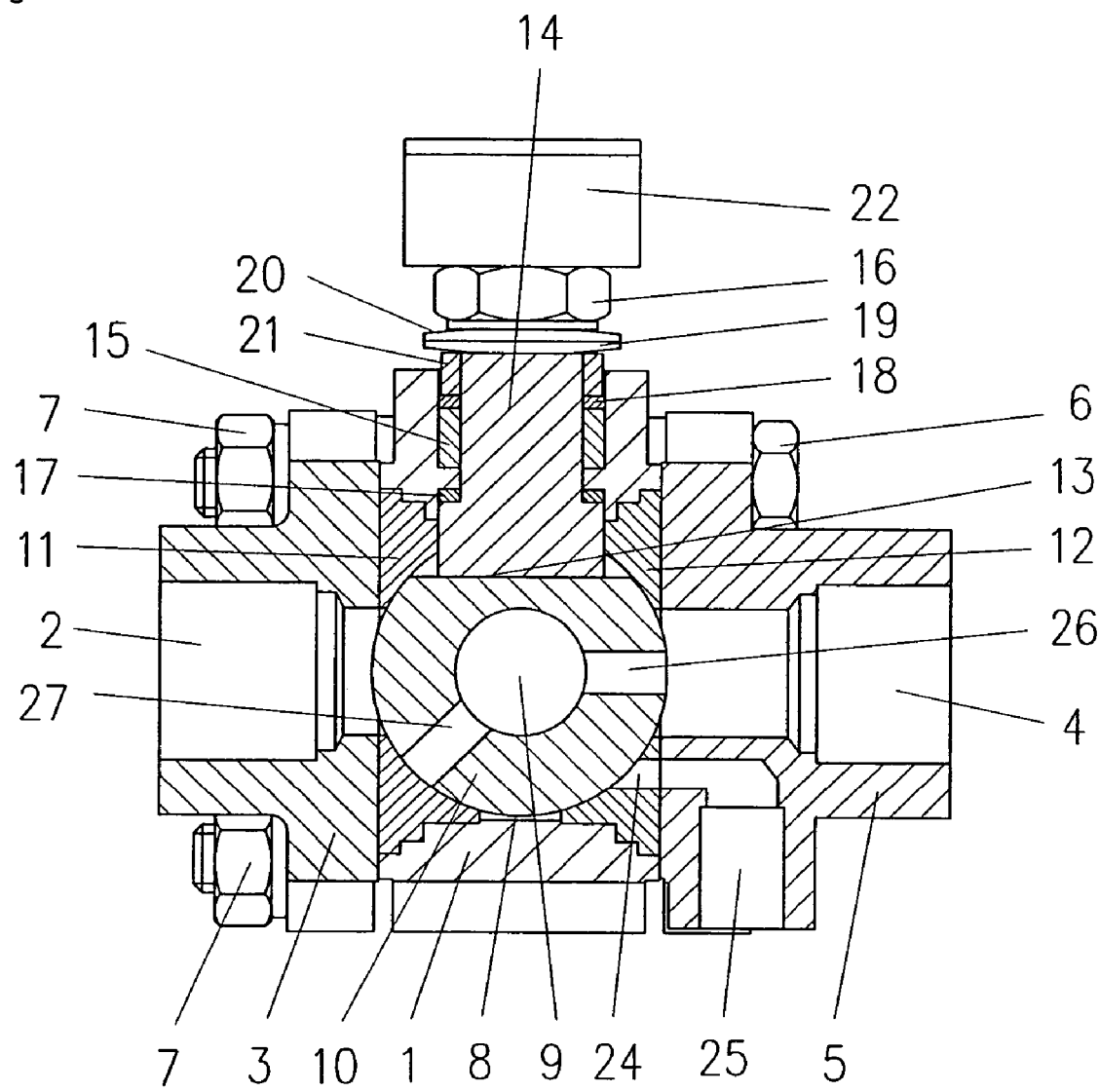
FIG. 4. is a central sectional view of FIG. 1 when the valve ball in FIG. 1 is rotated by 90 degrees in the clockwise direction to set the second disconnection state.

FIGS. 1 and 2 show a state where the entrance 2 and the exit 4 communicate with each other through the circulation hole 9 of the valve ball 10. When the valve shaft 14 is rotated by 90 degrees from this state in a counterclockwise direction with the handle 22, to set the first disconnection state as shown in FIG. 3 where the valve ball 10 disconnects the entrance 2 from the exit 4, the entrance 2 and the discharge orifice 25 communicate with each other through the first passage hole 26, the circulation hole 9, the second passage hole 27 and the through hole 24, and fluid at the entrance 2 can be discharged from the discharge orifice 25 communicating ambient air different from the entrance 2 and the exit 4. When the valve shaft 14 is rotated by 180 degrees with the handle 22 from the first disconnection state, to set the second disconnection state as shown in FIG. 4, the entrance 2, the exit 4 and the discharge orifice 25 are disconnected.

Another example embodiment of the invention is shown in FIGS. 5 to 8. A casing is formed by fastening an entrance side member 3 having an entrance 2 and an exit side member 5 having an exit 4 to a main body 1 with bolts 6 and nuts 7, and a valve chamber 8 where the entrance 2 and the exit 4 communicate with each other is formed in the casing.

A valve ball 10 where a circulation hole 9 is formed in a straight line in a horizontal direction is rotatably provided in the valve chamber 8. An entrance-side ring valve seat 11 is provided on the entrance 2 side of the valve ball 10, and an exit-side ring valve seat 12 is provided on the exit 4 side of the valve ball 10. The valve ball 10 has a parallel key groove 13 in its upper part, and a key member at a lower end of a valve shaft 14 passing through the main body 1 is engaged with the key groove. The valve shaft 14 holds airtightness with the main body 1 with a packing 15 and is fixed to the main body 1 with nuts 16. Reference numerals 17, 18, 19 and 20 denote washers; and 21, a packing holder. A handle 22 for rotation operation is fixed to the valve shaft 14 with nuts 23.

The exit-side ring valve seat 12 has a through hole 24 passing through from a contact surface of the valve ball 10 to a contact surface of the exit side member 5. The exit side member 5 has a discharge orifice 25 with one end communicating the through hole 24 of the exit-side ring valve seat 12 and the other end communicating ambient air. The through hole 24 is provided in a lower part of the exit-side ring valve seat 12 in parallel to a center line of the entrance 2 and the exit 4. The valve ball 10 has a first passage hole 26 which connects the circulation hole 9 with the entrance 2 in a first disconnection state where the valve ball 10 disconnects the entrance 2 from the exit 4, and which connects the circulation hole 9 with the exit 4 in a second disconnection state where the valve ball 10 is rotated by 180 degrees from the first disconnection state to disconnect the entrance 2 from the exit 4, and a third passage hole 28 which connects the circulation hole 9 with the through hole 24 in the second disconnection state and which is disconnected by the entrance-side ring valve seat 11 in the first disconnection state. The first passage hole 26 is provided in the horizontal direction at a right angle to the circulation hole 9, and its central axis passes through the center of the valve ball 10. The third passage hole 28 is provided downwardly by 45 degrees from the horizontal direction, and its central axis passes through the center of the valve ball 10.

Figure 5:
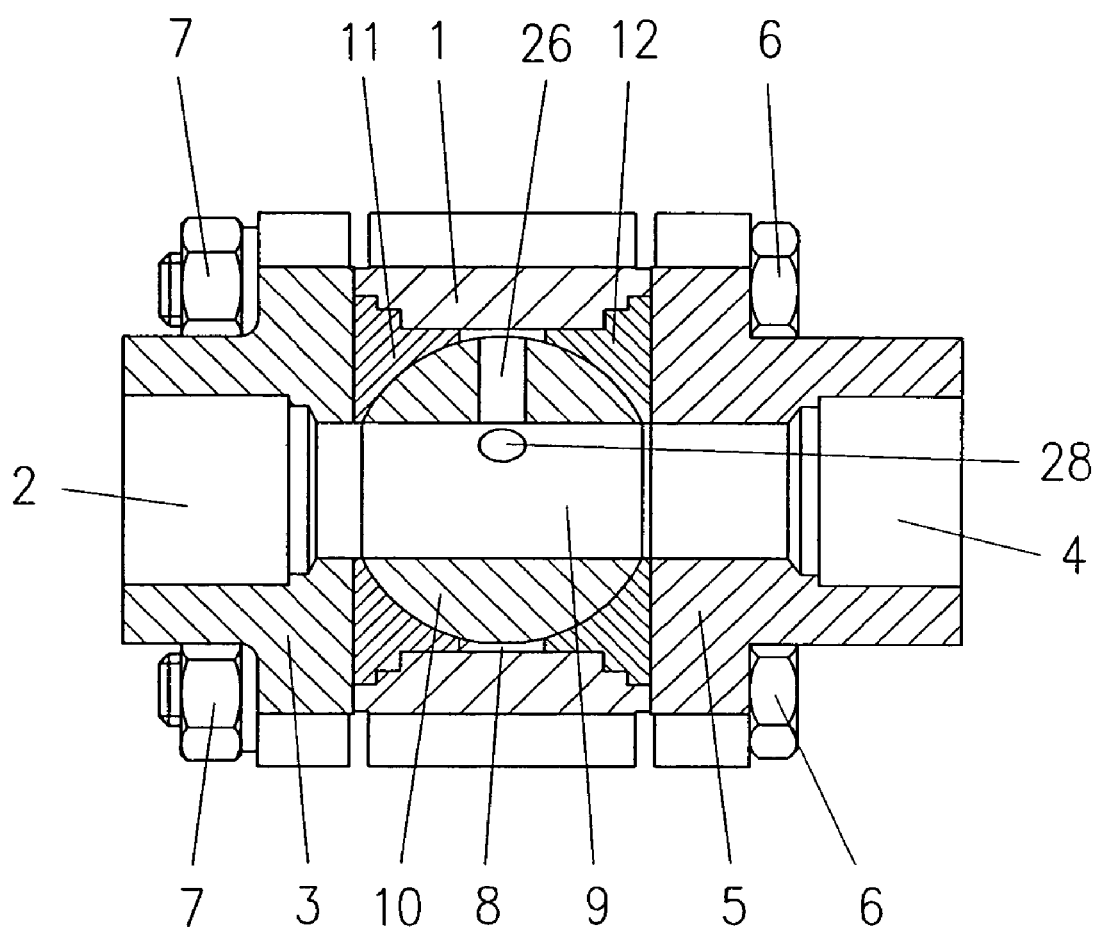
FIG. 5. is a transverse sectional view of the ball valve according to another example embodiment of the present invention.
Figure 6:
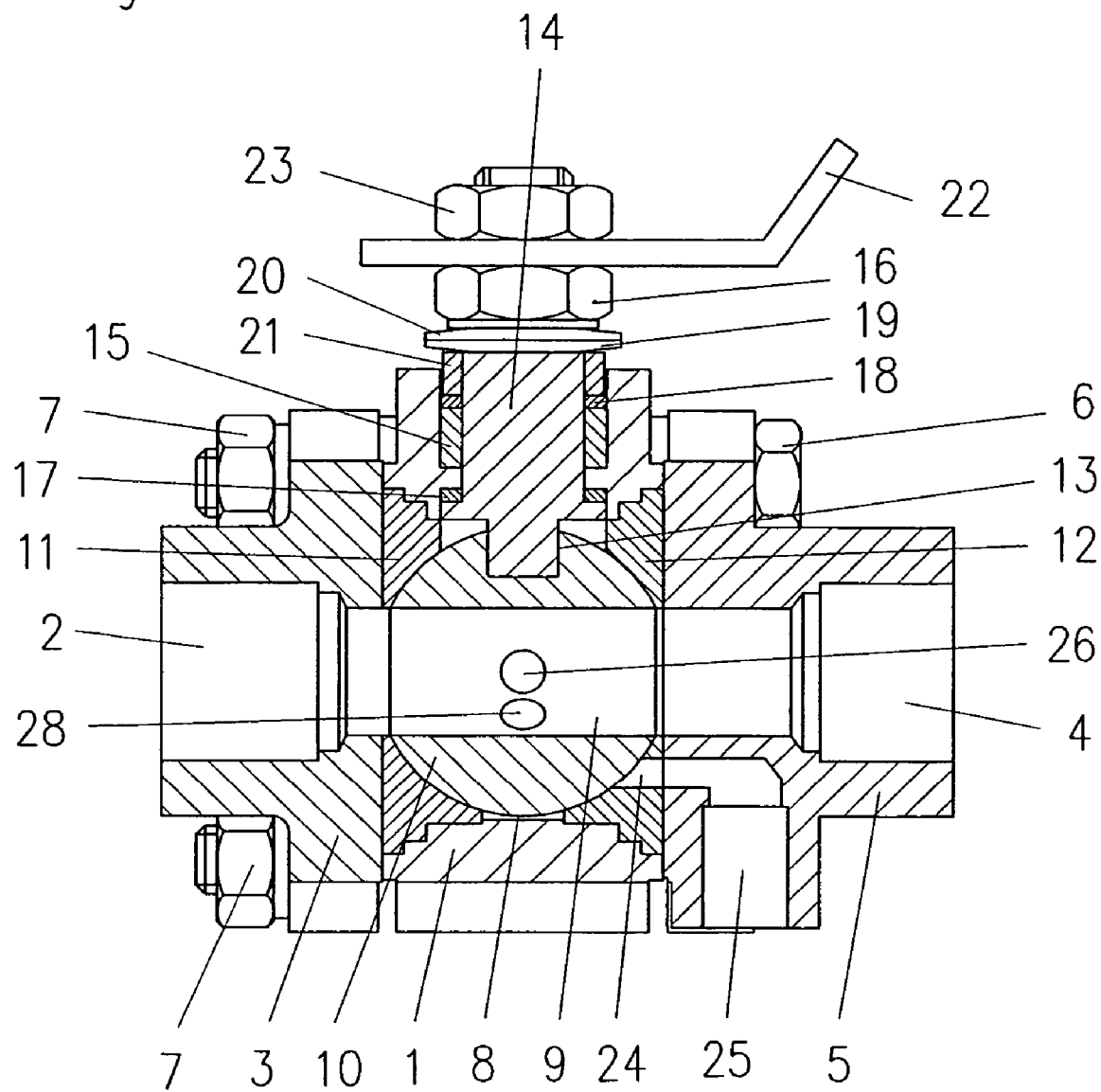
FIG. 6. is a central sectional view of FIG. 5.
Figure 7:
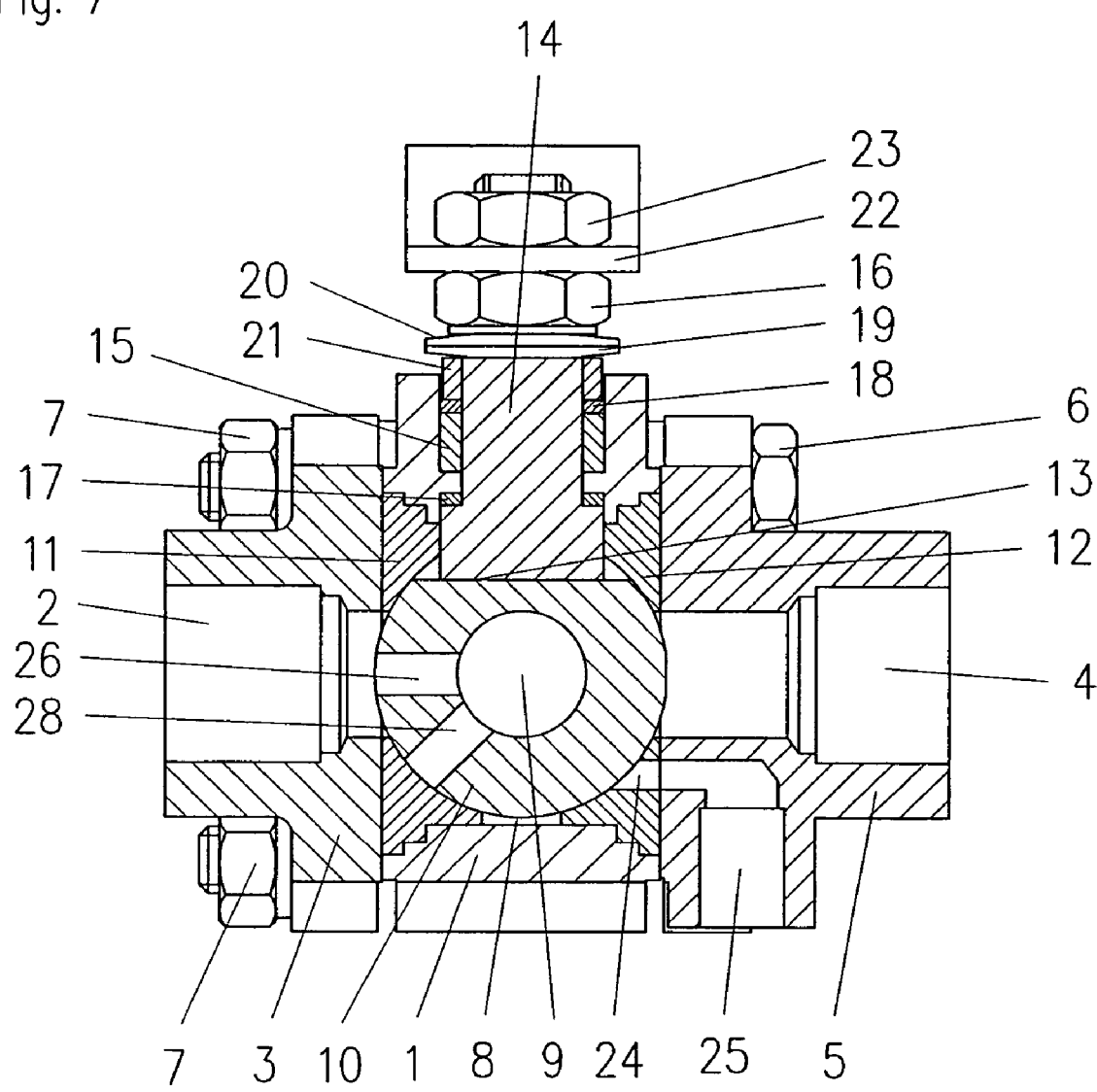
FIG. 7. is a central sectional view of FIG. 5 when the valve ball in FIG. 5 is rotated by 90 degrees in the counterclockwise direction to set the first disconnection state.
Figure 8:
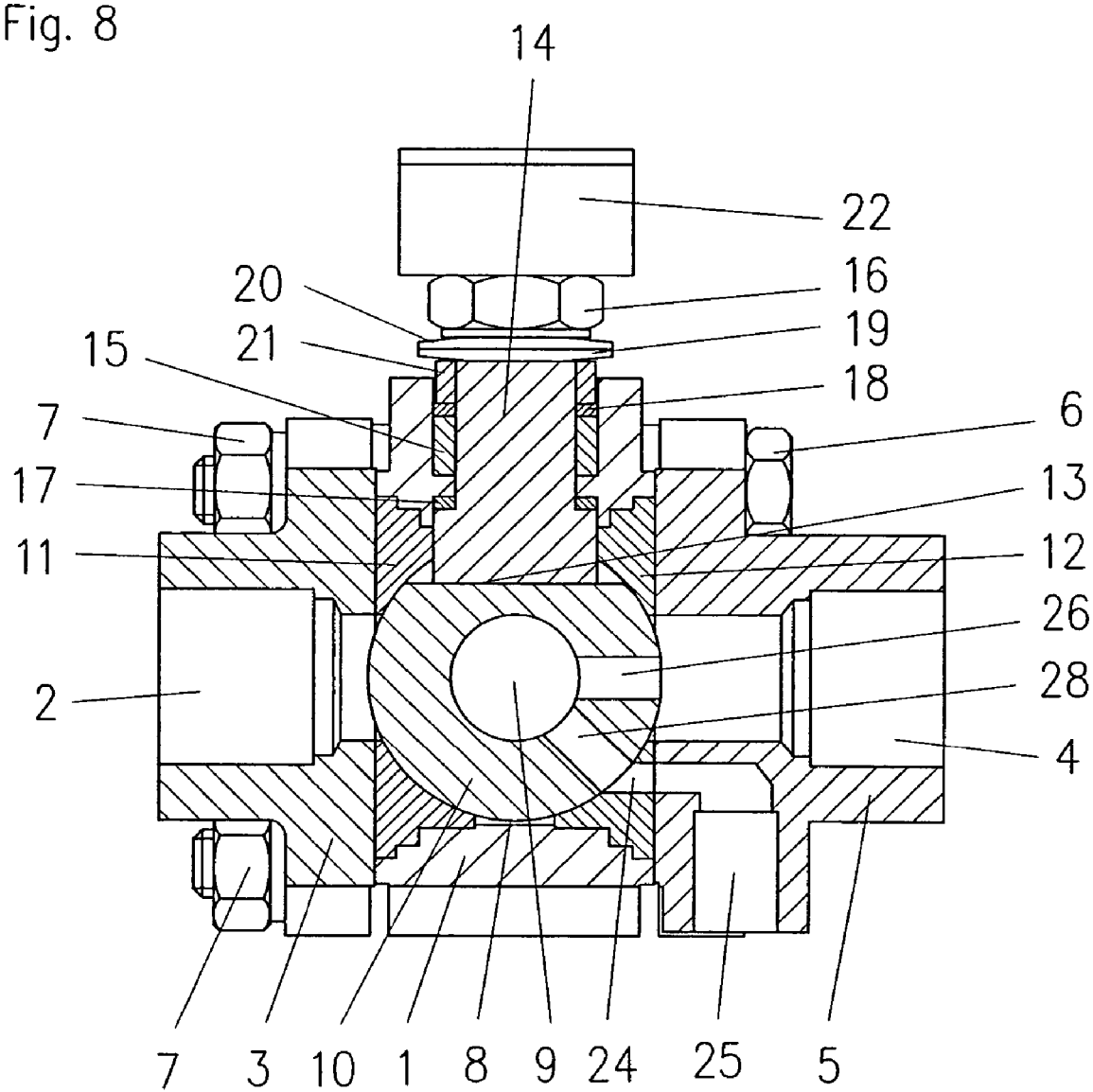
FIG. 8. is a central sectional view of FIG. 5 when the valve ball in FIG. 5 is rotated by 90 degrees in the clockwise direction to set the second disconnection state.

FIGS. 5 and 6 show a state where the entrance 2 and the exit 4 communicate with each other through the circulation hole 9 of the valve ball 10. When the valve shaft 14 is rotated by 90 degrees from this state in a counterclockwise direction with the handle 22, to set the first disconnection state as shown in FIG. 7 where the valve ball 10 disconnects the entrance 2 from the exit 4, the entrance 2, the exit 4 and the discharge orifice 25 are disconnected. When the valve shaft 14 is rotated by 180 degrees with the handle 22 from the first disconnection state, to set the second disconnection state as shown in FIG. 8, the exit 4 and the discharge orifice 25 communicate with each other through the first passage hole 26, the circulation hole 9, the third passage hole 28 and the through hole 24, and remaining pressure at the exit 4 can be released from the discharge orifice 25.

Another example embodiment of the invention is shown in FIGS. 9 to 12. A casing is formed by fastening an entrance side member 3 having an entrance 2 and an exit side member 5 having an exit 4 to a main body 1 with bolts 6 and nuts 7, and a valve chamber 8 where the entrance 2 and the exit 4 communicate with each other is formed in the casing.

A valve ball 10 where a circulation hole 9 is formed in a straight line in a horizontal direction is rotatably provided in the valve chamber 8. An entrance-side ring valve seat 11 is provided on the entrance 2 side of the valve ball 10, and an exit-side ring valve seat 12 is provided on the exit 4 side of the valve ball 10. The valve ball 10 has a parallel key groove 13 in its upper part, and a key member at a lower end of a valve shaft 14 passing through the main body 1 is engaged with the key groove. The valve shaft 14 holds airtightness with the main body 1 with a packing 15 and is fixed to the main body 1 with nuts 16. Reference numerals 17, 18, 19 and 20 denote washers; and 21, a packing holder. A handle 22 for rotation operation is fixed to the valve shaft 14 with nuts 23.

The exit-side ring valve seat 12 has a through hole 24 passing through from a contact surface of the valve ball 10 to a contact surface of the exit side member 5. The exit side member 5 has a discharge orifice 25 with one end communicating the through hole 24 of the exit-side ring valve seat 12 and the other end communicating ambient air. The through hole 24 is provided in a lower part of the exit-side ring valve seat 12 in parallel to a center line of the entrance 2 and the exit 4. The valve ball 10 has a first passage hole 26 which connects the circulation hole 9 with the entrance 2 in a first disconnection state where the valve ball 10 disconnects the entrance 2 from the exit 4, and which connects the circulation hole 9 with the exit 4 in a second disconnection state where the valve ball 10 is rotated by 180 degrees from the first disconnection state to disconnect the entrance 2 from the exit 4, a second passage hole 27 which connects the circulation hole 9 with the through hole 24 in the first disconnection state and which is disconnected by the entrance-side ring valve seat 11 in the second disconnection state, and a third passage hole 28 which connects the circulation hole 9 with the through hole 24 in the second disconnection state and which is disconnected by the entrance-side ring valve seat 11 in the first disconnection state. The first passage hole 26 is provided in the horizontal direction at a right angle to the circulation hole 9, and its central axis passes through the center of the valve ball 10. The second passage hole 27 and the third passage hole 28 are respectively provided downwardly by 45 degrees from the horizontal direction, and their respective central axes pass through the center of the valve ball 10.

Figure 9:
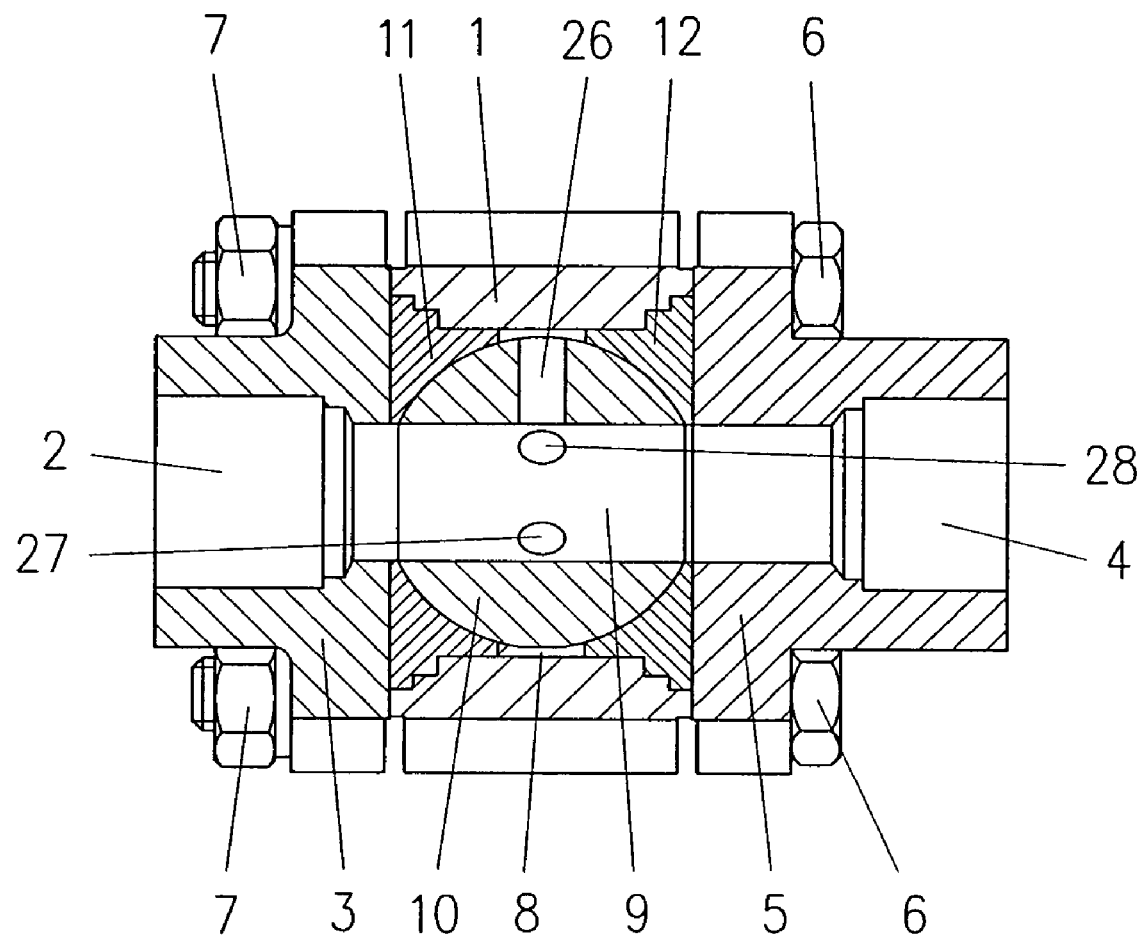
FIG. 9. is a transverse sectional view of the ball valve according to another example embodiment of the present invention.
Figure 10:
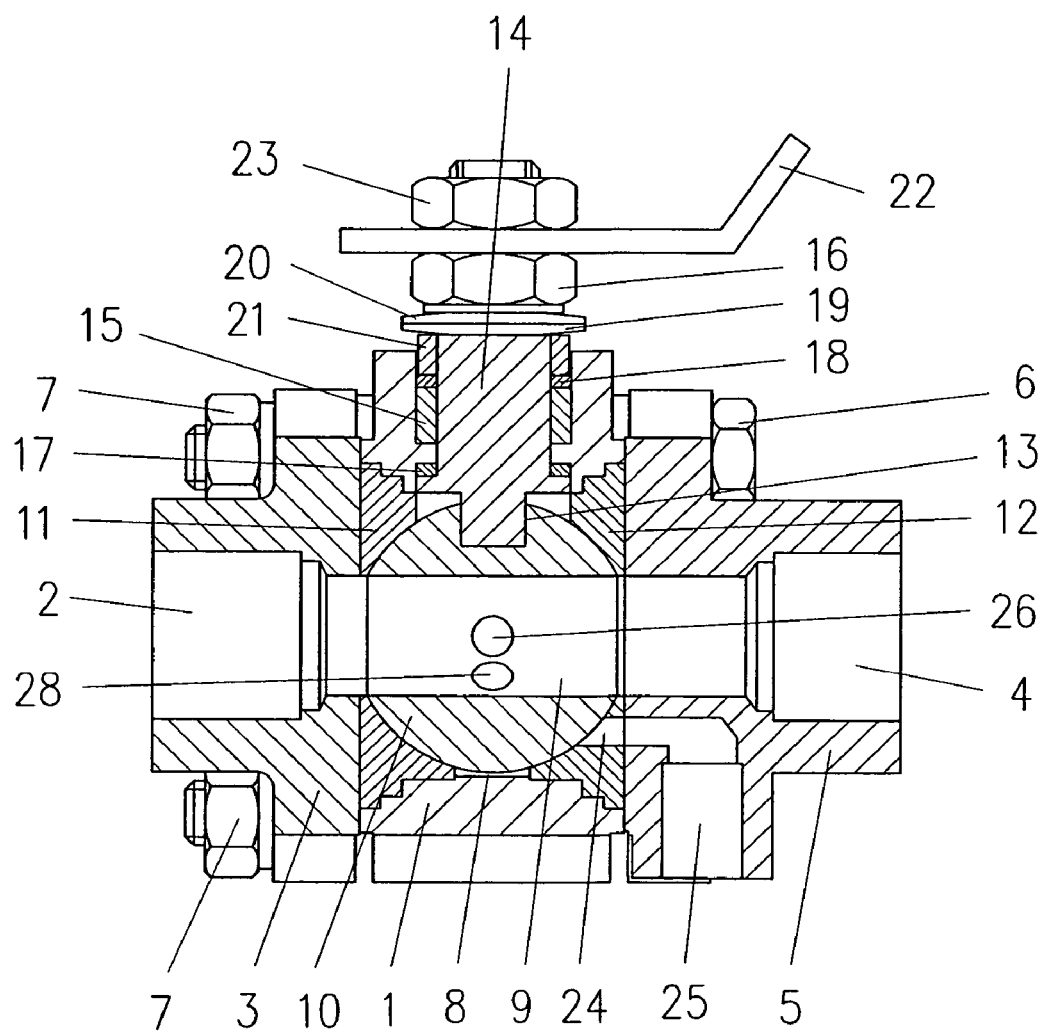
FIG. 10. is a central sectional view of FIG. 9.
Figure 11:
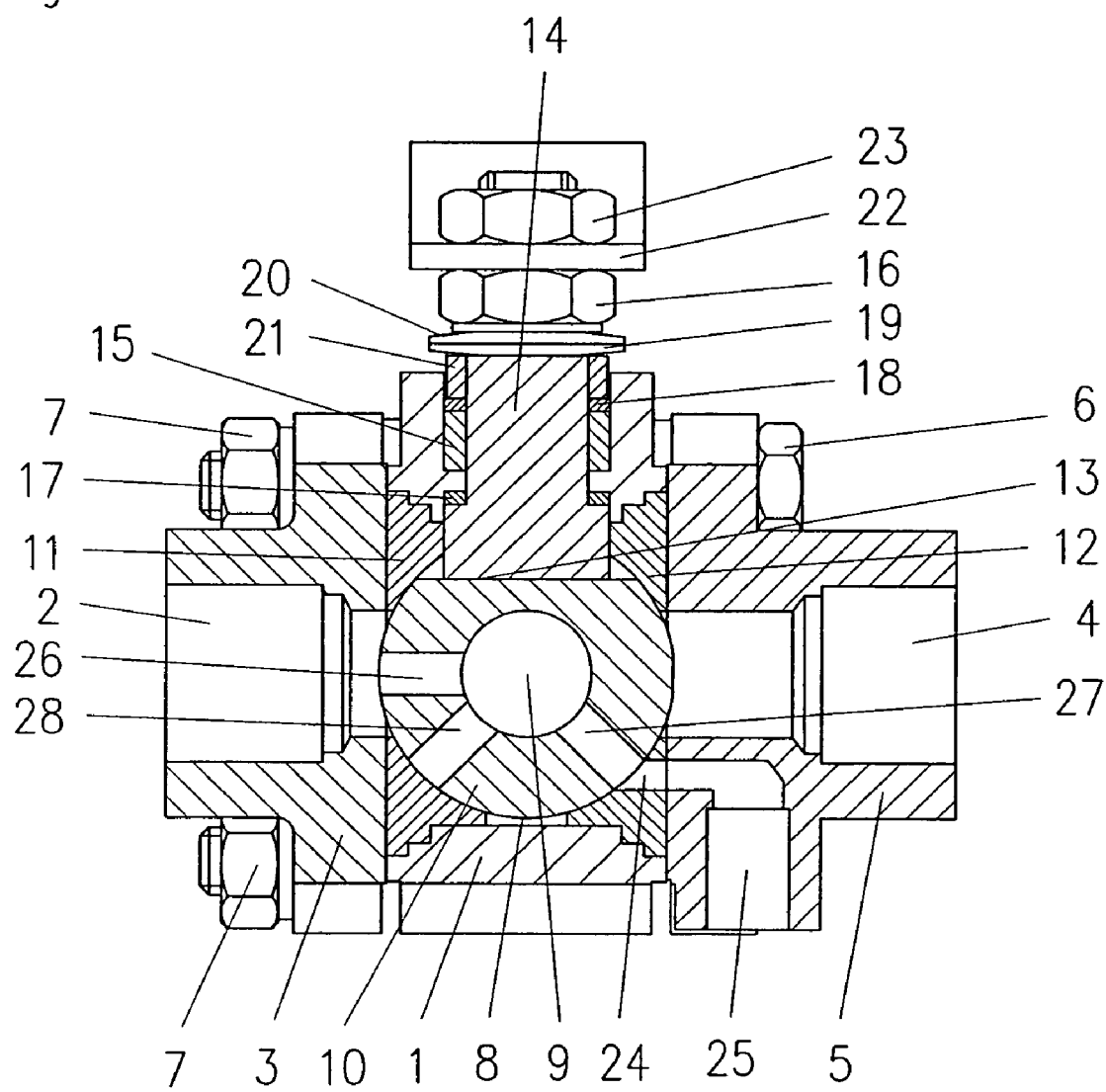
FIG. 11. is a central sectional view of FIG. 9 when the valve ball in FIG. 9 is rotated by 90 degrees in the counterclockwise direction to set the first disconnection state.
Figure 12:
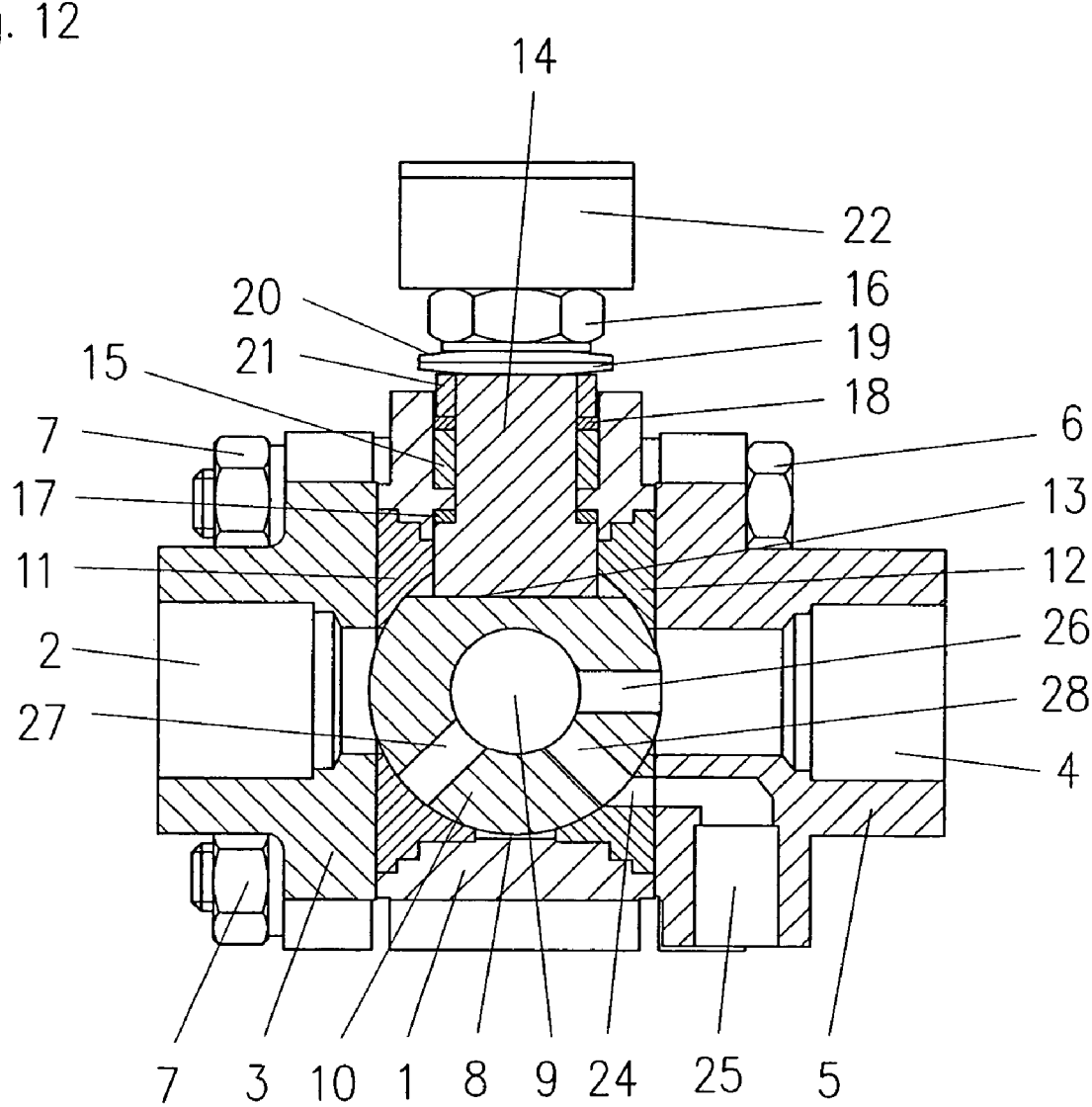
FIG. 12. is a central sectional view of FIG. 9 when the valve ball in FIG. 9 is rotated by 90 degrees in the clockwise direction to set the second disconnection state.

FIGS. 9 and 10 show a state where the entrance 2 and the exit 4 communicate with each other through the circulation hole 9 of the valve ball 10. When the valve shaft 14 is rotated by 90 degrees from this state in a counterclockwise direction with the handle 22, to set the first disconnection state as shown in FIG. 11 where the valve ball 10 disconnects the entrance 2 from the exit 4, the entrance 2 and the discharge orifice 25 communicate with each other through the first passage hole 26, the circulation hole 9, the second passage hole 27 and the through hole 24, and fluid at the entrance 2 can be discharged from the discharge orifice 25 communicating ambient air different from the entrance 2 and the exit 4. When the valve shaft 14 is rotated by 180 degrees with the handle 22 from the first disconnection state, to set the second disconnection state as shown in FIG. 12, the exit 4 and the discharge orifice 25 communicate with each other through the first passage hole 26, the circulation hole 9, the third passage hole 28 and the through hole 24, and remaining pressure at the exit 4 can be released from the discharge orifice 25.

Another example embodiment of the invention is shown in FIGS. 13 to 16. A casing is formed by fastening an entrance side member 53 having an entrance 52 and an exit side member 55 having an exit 54 to a main body 51 with bolts 56 and nuts 57, and a valve chamber 58 where the entrance 52 and the exit 54 communicate with each other is formed in the casing.

A valve ball 60 where a circulation hole 59 is formed in a straight line in a horizontal direction is rotatably provided in the valve chamber 58. An entrance-side ring valve seat 61 is provided on the entrance 52 side of the valve ball 60, and an exit-side ring valve seat 62 is provided on the exit 54 side of the valve ball 60. The valve ball 60 has a parallel key groove 63 in its upper part, and a key member at a lower end of a valve shaft 54 passing through the main body 51 is engaged with the key groove. The valve shaft 64 holds airtightness with the main body 51 with a packing 65 and is fixed to the main body 51 with nuts 66. Reference numerals 67, 68, 69 and 70 denote washers; and 71, a packing holder. A handle 72 for rotation operation is fixed to the valve shaft 64 with nuts 73.

The entrance-side ring valve seat 61 has a through hole 74 passing through from a contact surface of the valve ball 60 to a contact surface of the entrance side member 53. The entrance side member 53 has a discharge orifice 75 with one end communicating the through hole 74 of the entrance-side ring valve seat 61 and the other end communicating ambient air. The through hole 74 is provided in a lower part of the entrance-side ring valve seat 61 in parallel to a center line of the entrance 52 and the exit 54. The valve ball 60 has a first passage hole 76 which connects the circulation hole 59 with the entrance 52 in a first disconnection state where the valve ball 60 disconnects the entrance 52 from the exit 54, and which connects the circulation hole 59 with the exit 54 in a second disconnection state where the valve ball 60 is rotated by 180 degrees from the first disconnection state to disconnect the entrance 52 from the exit 54, and a second passage hole 77 which connects the circulation hole 59 with the through hole 74 in the first disconnection state and which is disconnected by the exit-side ring valve seat 62 in the second disconnection state. The first passage hole 76 is provided in the horizontal direction at a right angle to the circulation hole 59, and its central axis passes through the center of the valve ball 60. The second passage hole 77 is provided downwardly by 45 degrees from the horizontal direction, and its central axis passes through the center of the valve ball 60.

Figure 13:
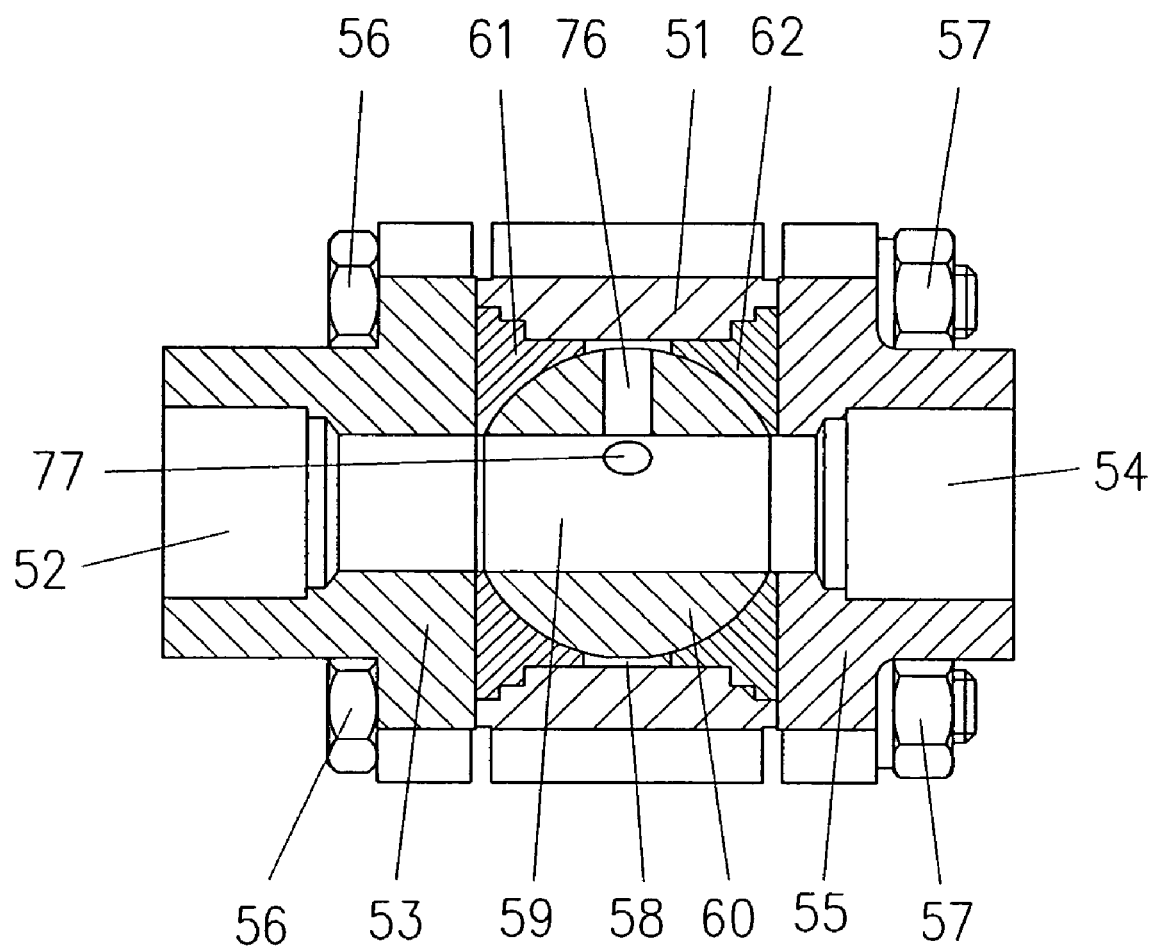
FIG. 13. is a transverse sectional view of the ball valve according to another example embodiment of the present invention.
Figure 14:
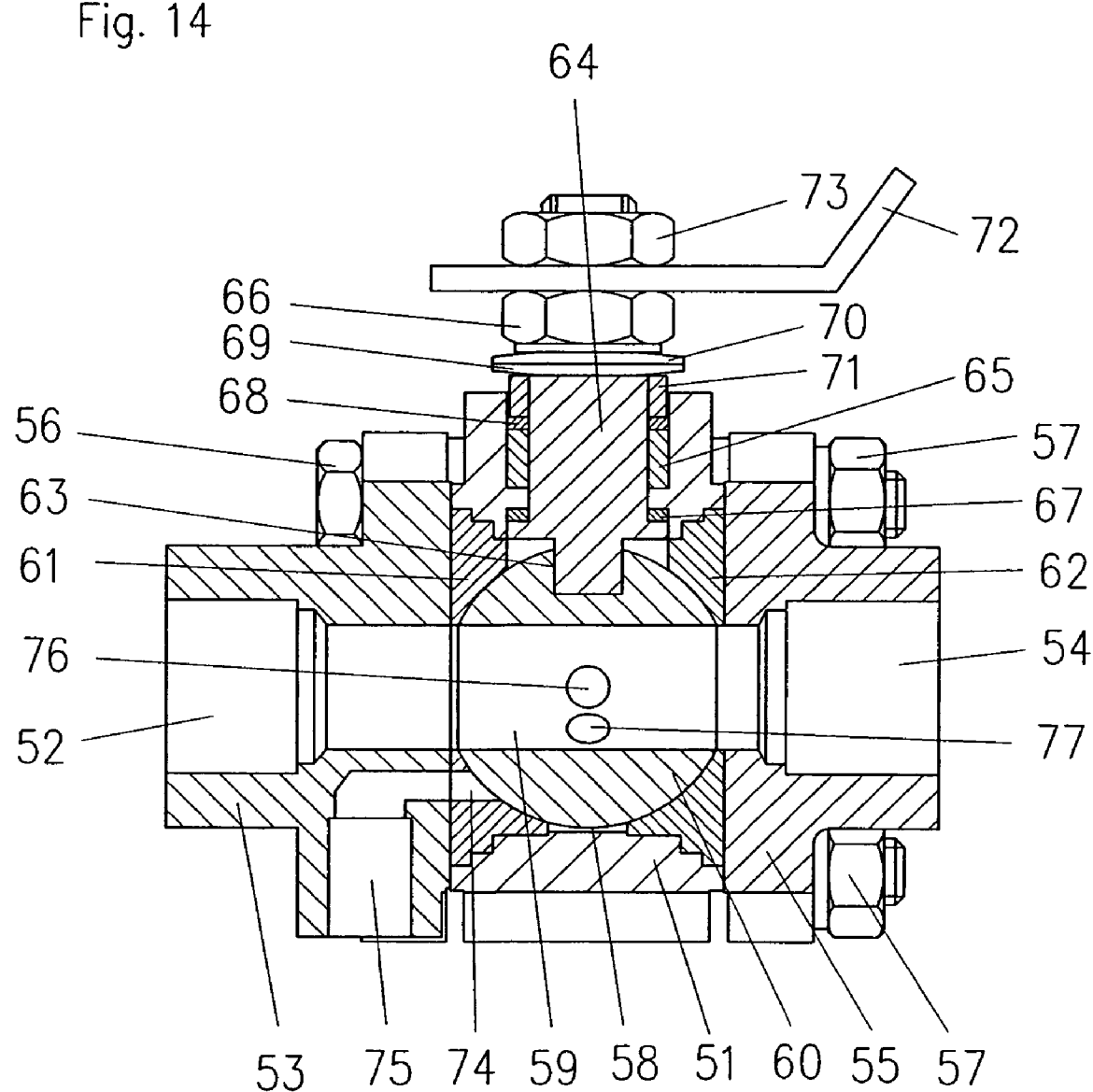
FIG. 14. is a central sectional view of FIG. 13.
Figure 15:
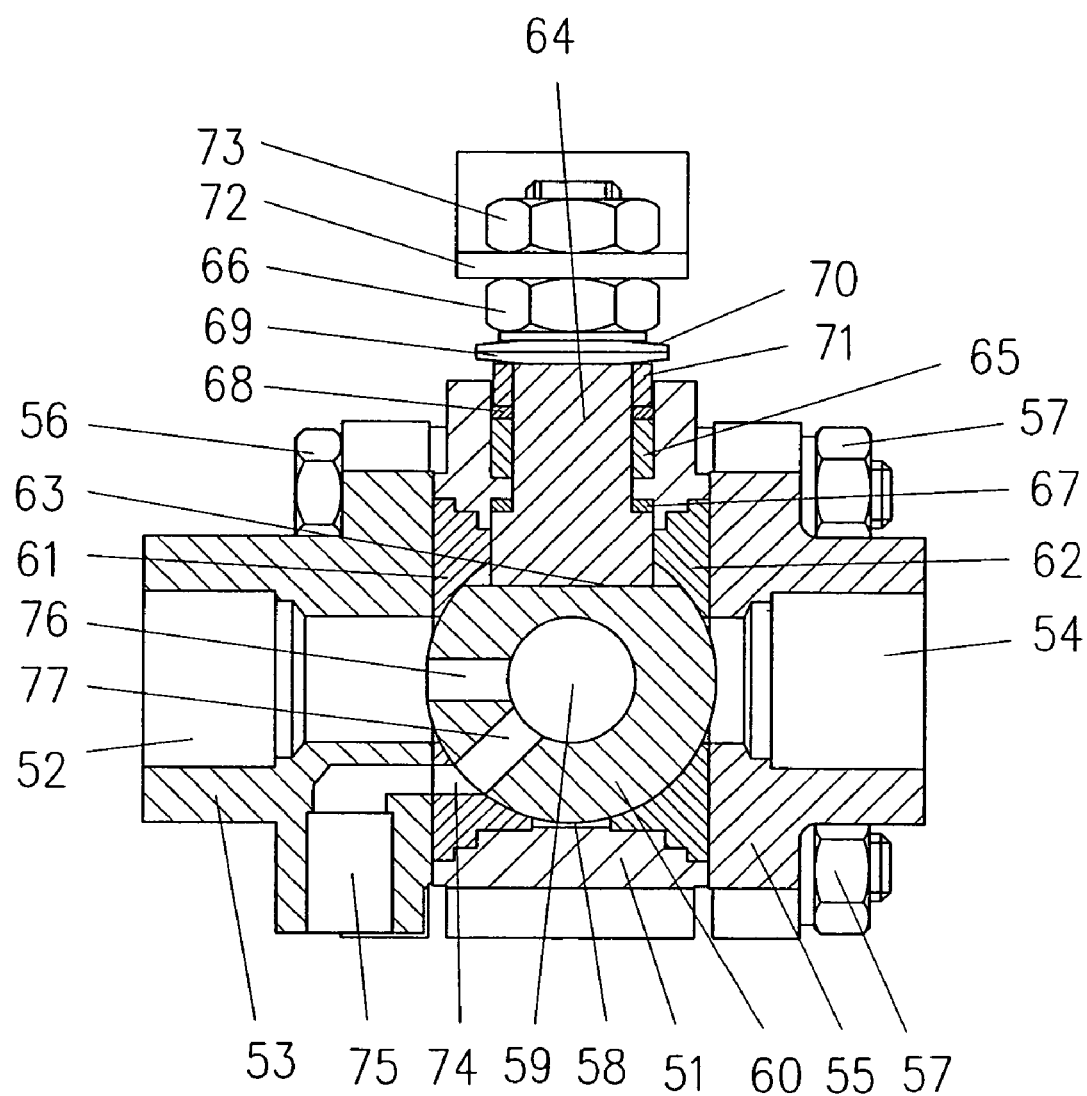
FIG. 15. is a central sectional view of FIG. 13 when the valve ball in FIG. 13 is rotated by 90 degrees in the counterclockwise direction to set the first disconnection state.
Figure 16:
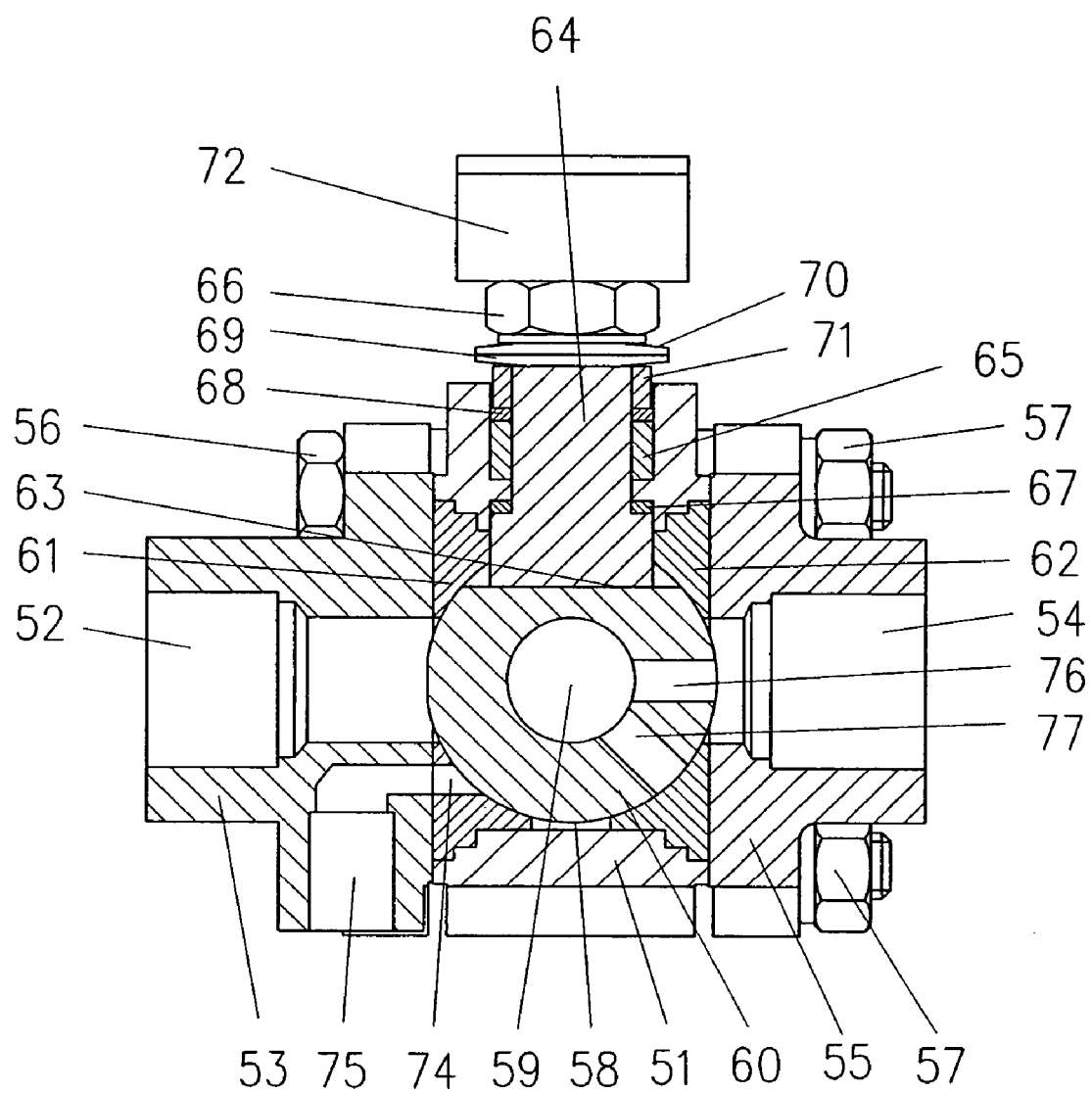
FIG. 16. is a central sectional view of FIG. 13 when the valve ball in FIG. 13 is rotated by 90 degrees in the clockwise direction to set the second disconnection state.

FIGS. 13 and 14 show a state where the entrance 52 and the exit 54 communicate with each other through the circulation hole 59 of the valve ball 60. When the valve shaft 64 is rotated by 90 degrees from this state in a counterclockwise direction with the handle 72, to set the first disconnection state as shown in FIG. 15 where the valve ball 60 disconnects the entrance 52 from the exit 54, the entrance 52 and the discharge orifice 75 communicate with each other through the first passage hole 76, the circulation hole 59, the second passage hole 77 and the through hole 74, and fluid at the entrance 52 can be discharged from the discharge orifice 75 communicating ambient air different from the entrance 52 and the exit 54. When the valve shaft 64 is rotated by 180 degrees with the handle 72 from the first disconnection state, to set the second disconnection state as shown in FIG. 16, the entrance 52, the exit 54 and the discharge orifice 75 are disconnected.

Another example embodiment of the invention is shown in FIGS. 17 to 20. A casing is formed by fastening an entrance side member 53 having an entrance 52 and an exit side member 55 having an exit 54 to a main body 51 with bolts 56 and nuts 57, and a valve chamber 58 where the entrance 52 and the exit 54 communicate with each other is formed in the casing.

A valve ball 60 where a circulation hole 59 is formed in a straight line in a horizontal direction is rotatably provided in the valve chamber 58. An entrance-side ring valve seat 61 is provided on the entrance 52 side of the valve ball 60, and an exit-side ring valve seat 62 is provided on the exit 54 side of the valve ball 60. The valve ball 60 has a parallel key groove 63 in its upper part, and a key member at a lower end of a valve shaft 54 passing through the main body 51 is engaged with the key groove. The valve shaft 64 holds airtightness with the main body 51 with a packing 65 and is fixed to the main body 51 with nuts 66. Reference numerals 67, 68, 69 and 70 denote washers; and 71, a packing holder. A handle 72 for rotation operation is fixed to the valve shaft 64 with nuts 73.

The entrance-side ring valve seat 61 has a through hole 74 passing through from a contact surface of the valve ball 60 to a contact surface of the entrance side member 53. The entrance side member 53 has a discharge orifice 75 with one end communicating the through hole 74 of the entrance-side ring valve seat 61 and the other end communicating ambient air. The through hole 74 is provided in a lower part of the entrance-side ring valve seat 61 in parallel to a center line of the entrance 52 and the exit 54. The valve ball 60 has a first passage hole 76 which connects the circulation hole 59 with the entrance 52 in a first disconnection state where the valve ball 60 disconnects the entrance 52 from the exit 54, and which connects the circulation hole 59 with the exit 54 in a second disconnection state where the valve ball 60 is rotated by 180 degrees from the first disconnection state to disconnect the entrance 52 from the exit 54, and a third passage hole 78 which connects the circulation hole 59 with the through hole 74 in the second disconnection state and which is disconnected by the exit-side ring valve seat 62 in the first disconnection state. The first passage hole 76 is provided in the horizontal direction at a right angle to the circulation hole 59, and its central axis passes through the center of the valve ball 60. The third passage hole 78 is provided downwardly by 45 degrees from the horizontal direction, and its central axis passes through the center of the valve ball 60.

Figure 17:
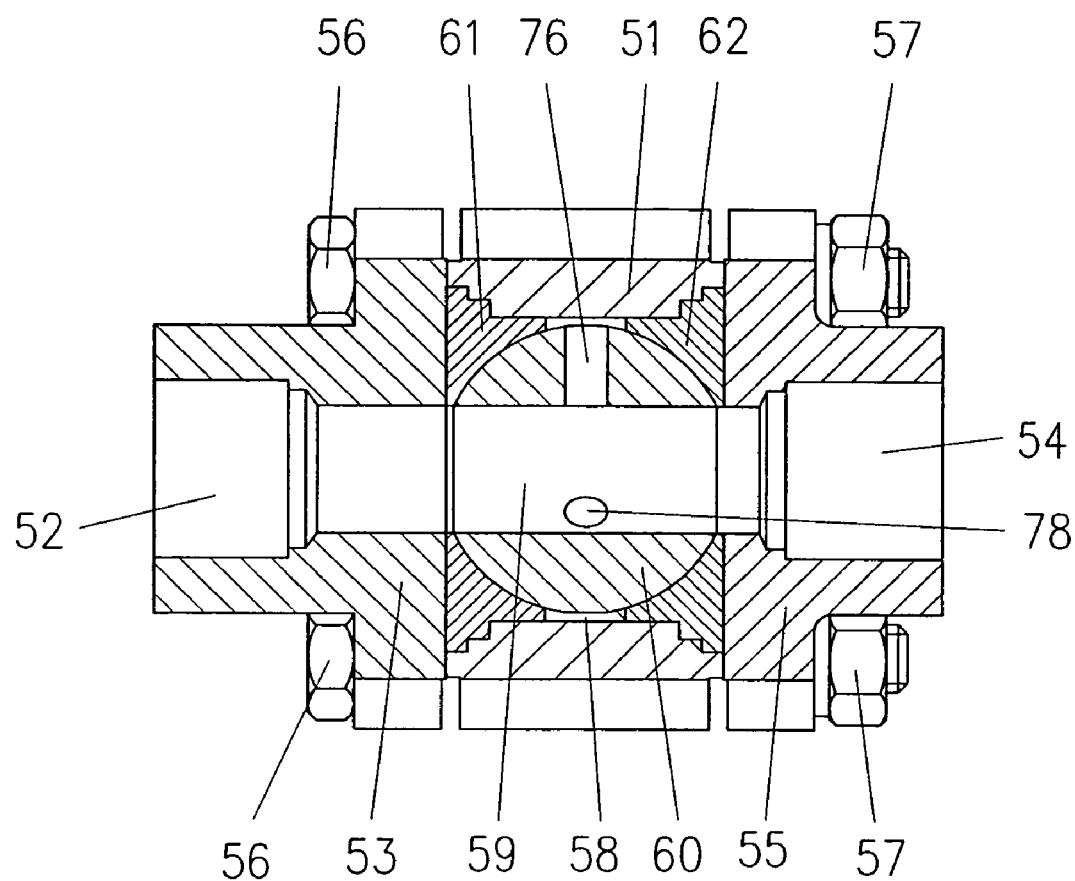
FIG. 17. is a transverse sectional view of the ball valve according to another example embodiment of the present invention.
Figure 18:
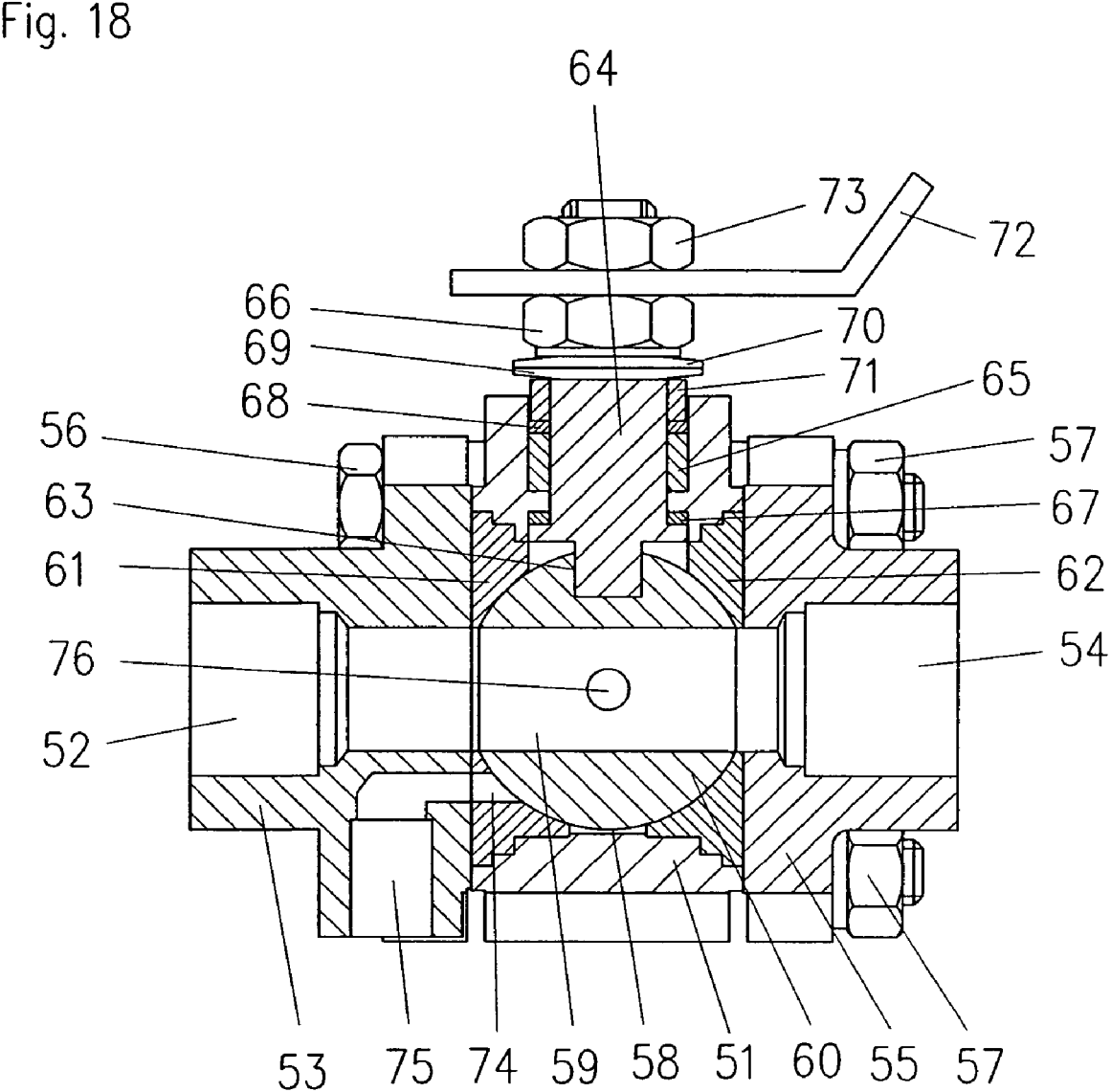
FIG. 18. is a central sectional view of FIG. 17.
Figure 19:
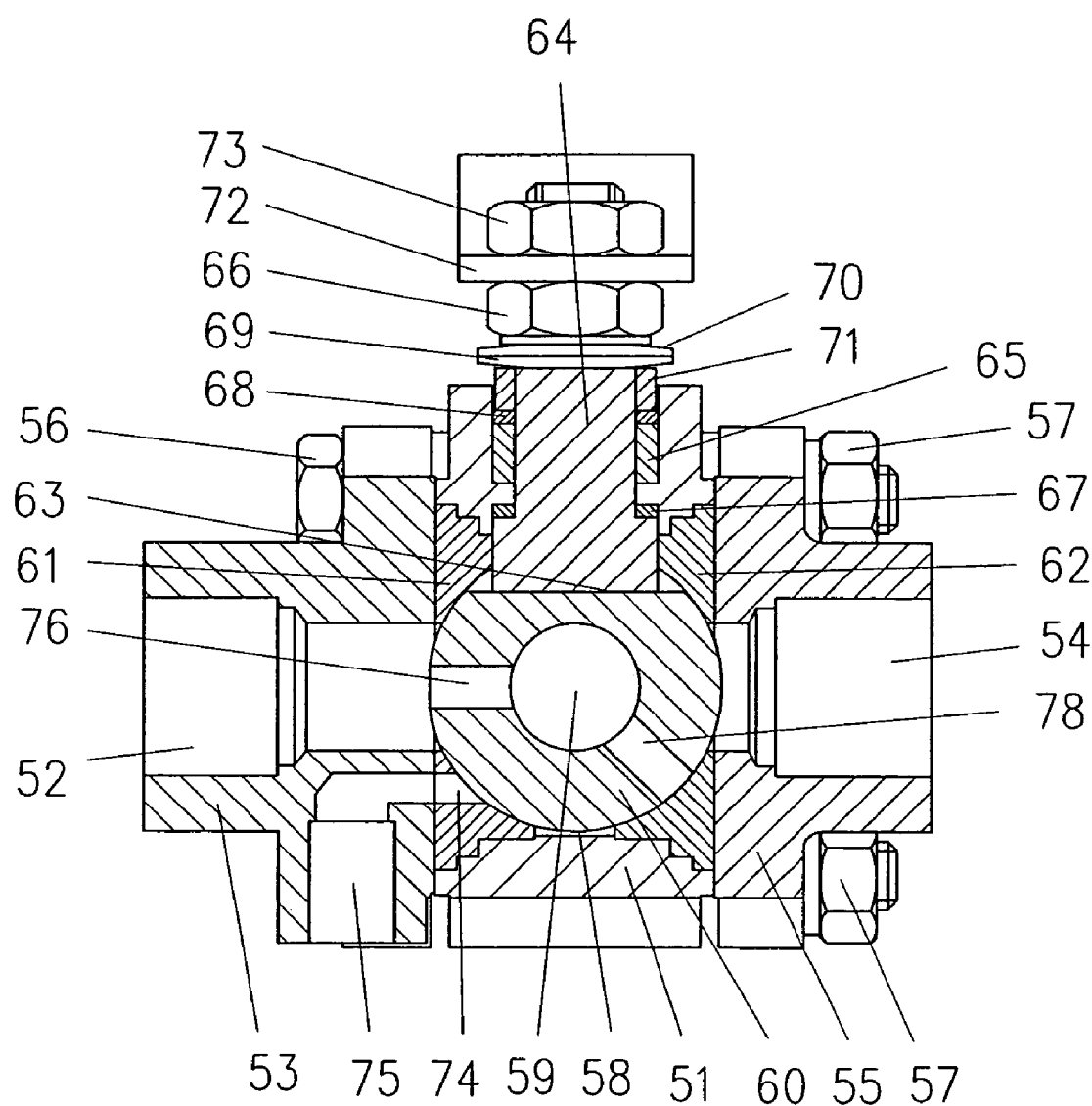
FIG. 19. is a central sectional view of FIG. 17 when the valve ball in FIG. 17 is rotated by 90 degrees in the counterclockwise direction to set the first disconnection state.
Figure 20:
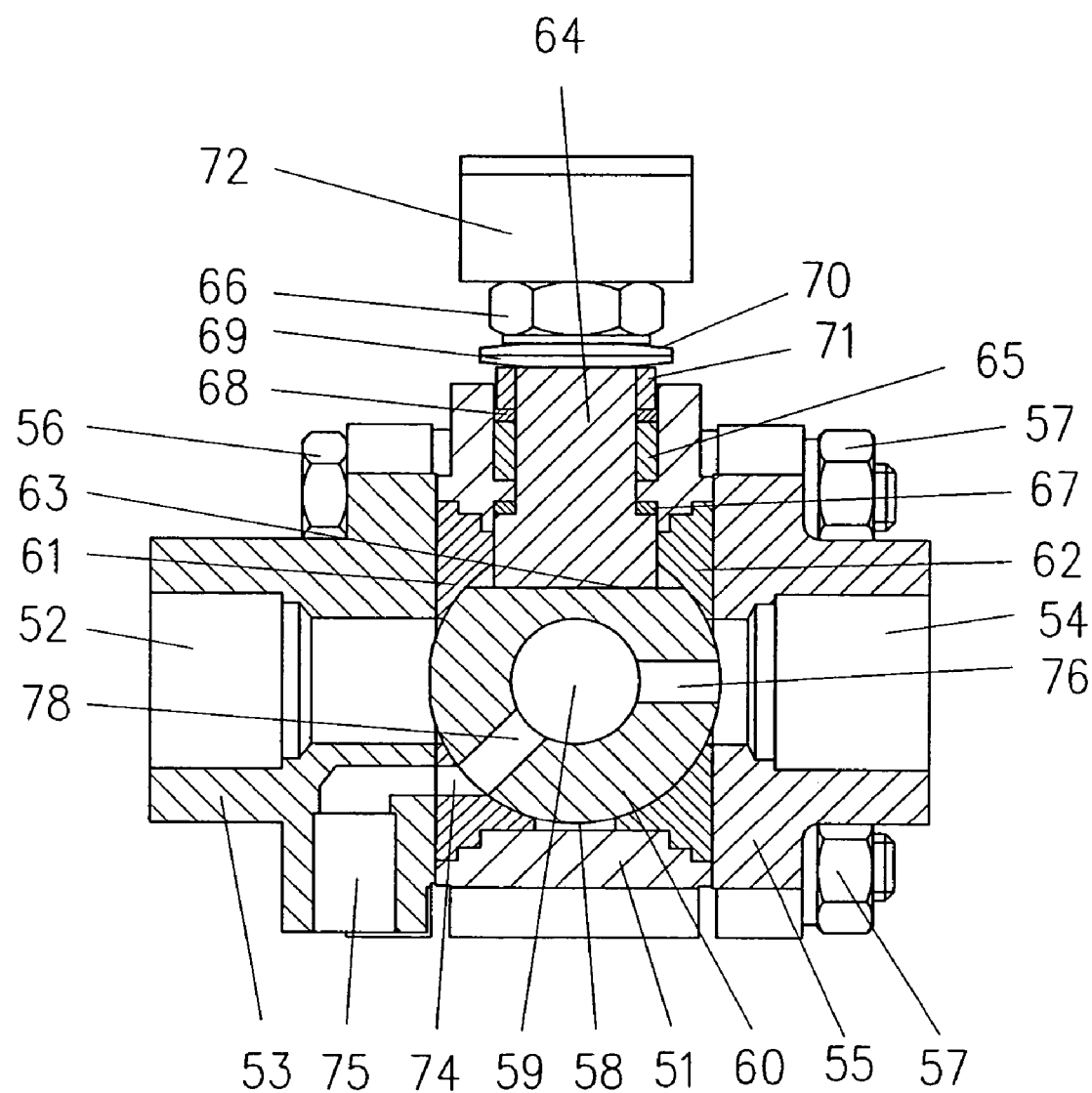
FIG. 20. is a central sectional view of FIG. 17 when the valve ball in FIG. 17 is rotated by 90 degrees in the clockwise direction to set the second disconnection state.

FIGS. 17 and 18 show a state where the entrance 52 and the exit 54 communicate with each other through the circulation hole 59 of the valve ball 60. When the valve shaft 64 is rotated by 90 degrees from this state in a counterclockwise direction with the handle 72, to set the first disconnection state as shown in FIG. 19 where the valve ball 60 disconnects the entrance 52 from the exit 54, the entrance 52, the exit 54 and the discharge orifice 75 are disconnected. When the valve shaft 64 is rotated by 180 degrees with the handle 72 from the first disconnection state, to set the second disconnection state as shown in FIG. 20, the exit 54 and the discharge orifice 75 communicate with each other through the first passage hole 76, the circulation hole 59, the third passage hole 78 and the through hole 74, and remaining pressure at the exit 54 can be released from the discharge orifice 75.

Another example embodiment of the invention is shown in FIGS. 21 to 24. A casing is formed by fastening an entrance side member 53 having an entrance 52 and an exit side member 55 having an exit 54 to a main body 51 with bolts 56 and nuts 57, and a valve chamber 58 where the entrance 52 and the exit 54 communicate with each other is formed in the casing.

A valve ball 60 where a circulation hole 59 is formed in a straight line in a horizontal direction is rotatably provided in the valve chamber 58. An entrance-side ring valve seat 61 is provided on the entrance 52 side of the valve ball 60, and an exit-side ring valve seat 62 is provided on the exit 54 side of the valve ball 60. The valve ball 60 has a parallel key groove 63 in its upper part, and a key member at a lower end of a valve shaft 54 passing through the main body 51 is engaged with the key groove. The valve shaft 64 holds airtightness with the main body 51 with a packing 65 and is fixed to the main body 51 with nuts 66. Reference numerals 67, 68, 69 and 70 denote washers; and 71, a packing holder. A handle 72 for rotation operation is fixed to the valve shaft 64 with nuts 73.

The entrance-side ring valve seat 61 has a through hole 74 passing through from a contact surface of the valve ball 60 to a contact surface of the entrance side member 53. The entrance side member 53 has a discharge orifice 75 with one end communicating the through hole 74 of the entrance-side ring valve seat 61 and the other end communicating ambient air. The through hole 74 is provided in a lower part of the entrance-side ring valve seat 61 in parallel to a center line of the entrance 52 and the exit 54. The valve ball 60 has a first passage hole 76 which connects the circulation hole 59 with the entrance 52 in a first disconnection state where the valve ball 60 disconnects the entrance 52 from the exit 54 and which connects the circulation hole 59 with the exit 54 in a second disconnection state where the valve ball 60 is rotated by 180 degrees from the first disconnection state to disconnect the entrance 52 from the exit 54, a second passage hole 77 which connects the circulation hole 59 with the through hole 74 in the first disconnection state and which is disconnected by the exit-side ring valve seat 62 in the second disconnection state, and a third passage hole 78 which connects the circulation hole 59 with the through hole 74 in the second disconnection state and which is disconnected by the exit-side ring valve seat 62 in the first disconnection state. The first passage hole 76 is provided in the horizontal direction at a right angle to the circulation hole 59, and its central axis passes through the center of the valve ball 60. The second passage hole 77 and the third passage hole 78 are respectively provided downwardly by 45 degrees from the horizontal direction, and their respective central axes pass through the center of the valve ball 60.

Figure 21:
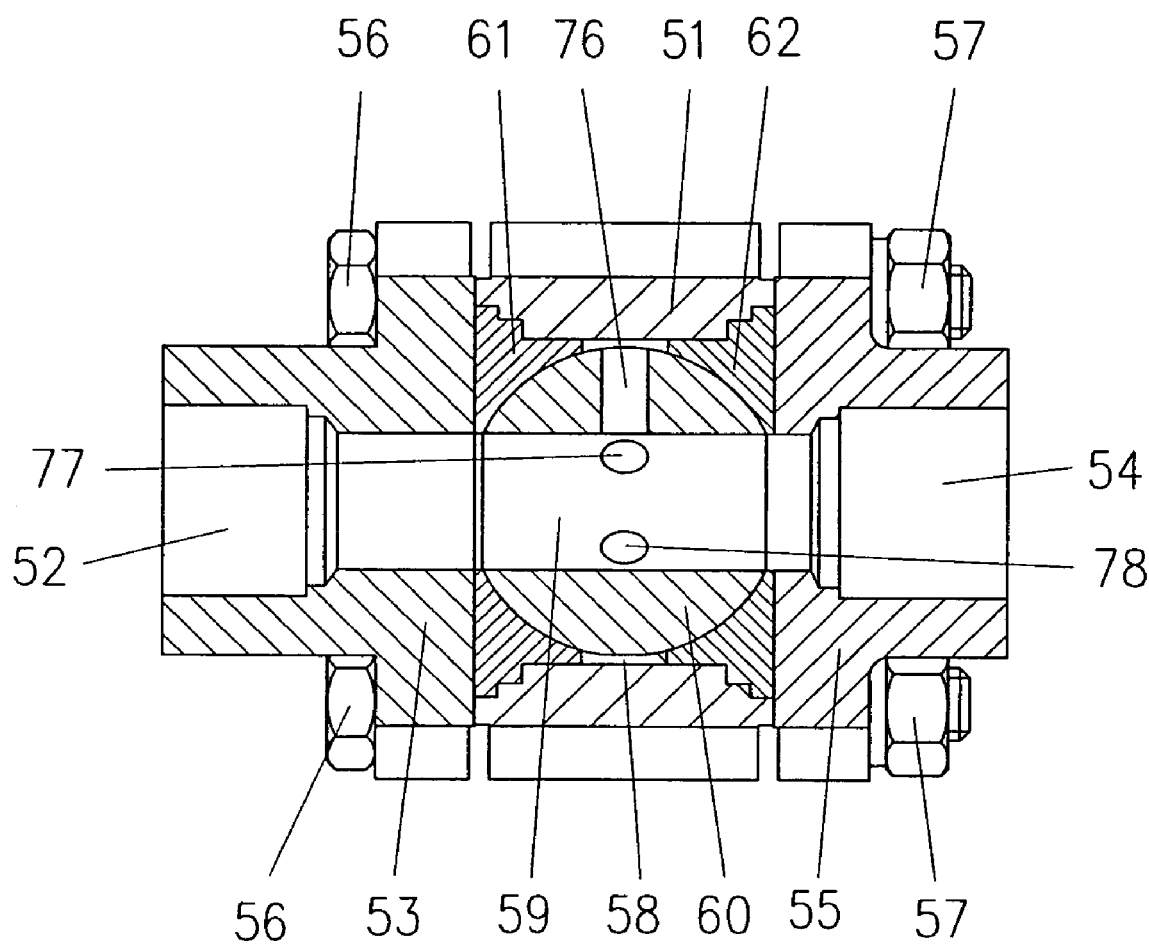
FIG. 21. is a transverse sectional view of the ball valve according to another example embodiment of the present invention.
Figure 22:
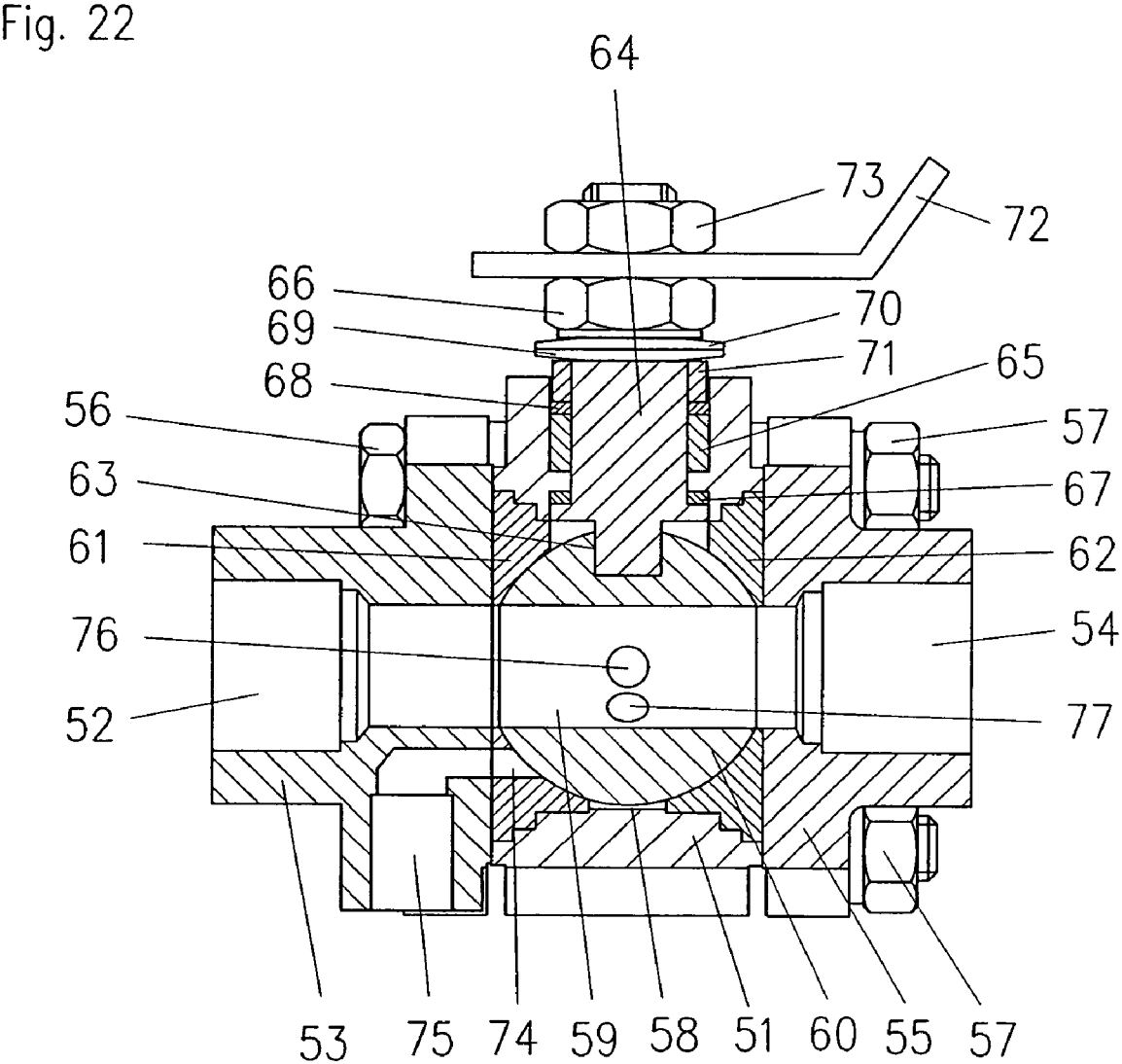
FIG. 22. is a central sectional view of FIG. 21.
Figure 23:
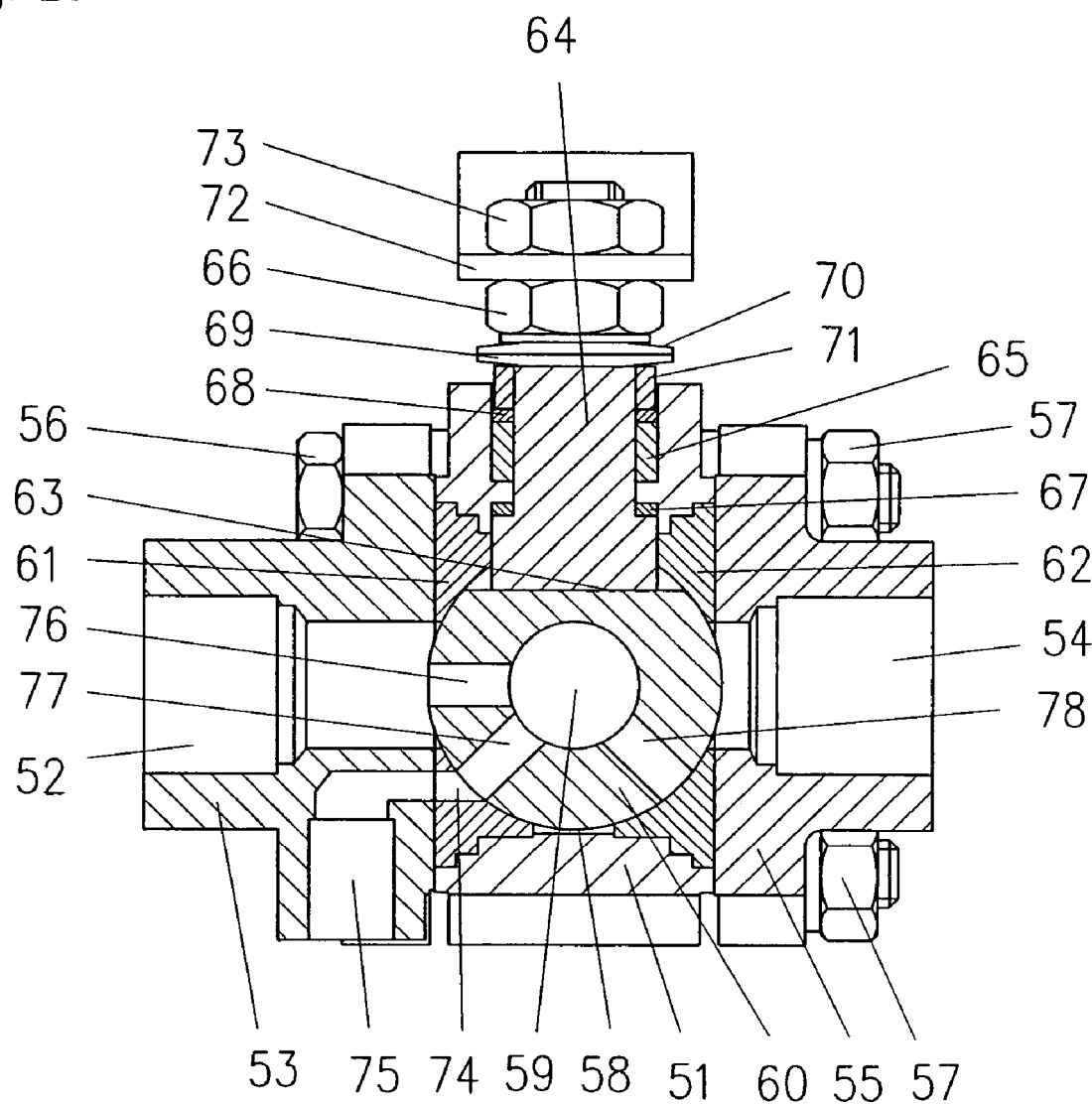
FIG. 23. is a central sectional view of FIG. 21 when the valve ball in FIG. 21 is rotated by 90 degrees in the counterclockwise direction to set the first disconnection state.
Figure 24:
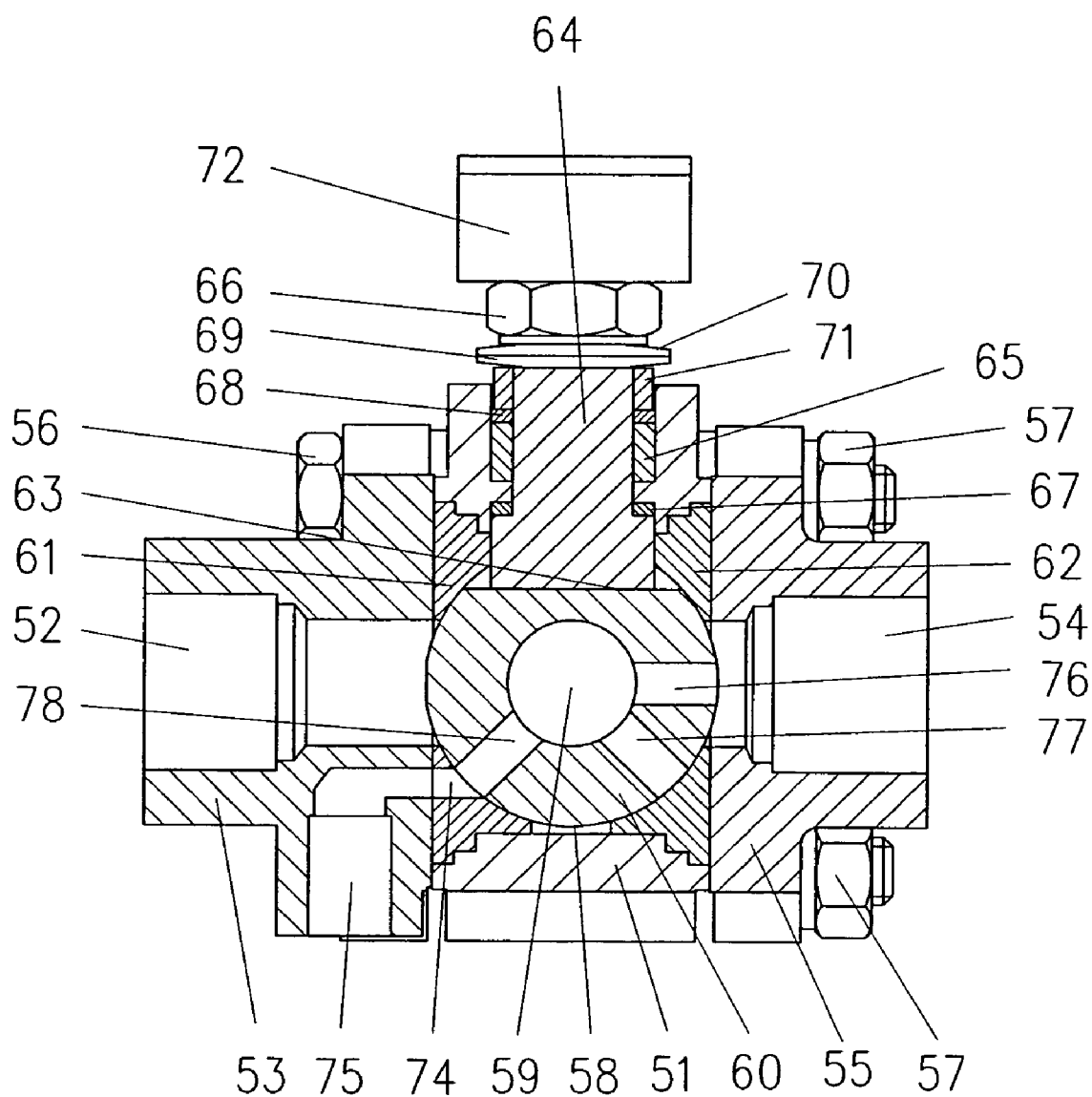
FIG. 24. is a central sectional view of FIG. 21 when the valve ball in FIG. 21 is rotated by 90 degrees in the clockwise direction to set the second disconnection state.

FIGS. 21 and 22 show a state where the entrance 52 and the exit 54 communicate with each other through the circulation hole 59 of the valve ball 60. When the valve shaft 64 is rotated by 90 degrees from this state in a counterclockwise direction with the handle 72, to set the first disconnection state as shown in FIG. 23 where the valve ball 60 disconnects the entrance 52 from the exit 54, the entrance 52 and the discharge orifice 75 communicate with each other through the first passage hole 76, the circulation hole 59, the second passage hole 77 and the through hole 74, and fluid at the entrance 52 can be discharged from the discharge orifice 75 communicating ambient air different from the entrance 52 and the exit 54. When the valve shaft 64 is rotated by 180 degrees with the handle 72 from the first disconnection state, to set the second disconnection state as shown in FIG. 24, the exit 54 and the discharge orifice 75 communicate with each other through the first passage hole 76, the circulation hole 59, the third passage hole 78 and the through hole 74, and remaining pressure at the exit 54 can be released from the discharge orifice 75.

In the present invention, as set forth above, fluid at the entrance can be discharged from the discharge orifice communicating ambient air different from the entrance and exit and/or remaining pressure at the exit can be released from the discharge orifice.

What is claimed is:

1. A ball valve comprising:
a casing comprising an entrance, a valve chamber, an exit and a discharge orifice, wherein said discharge orifice communicates with ambient air when said ball valve is installed in a piping system;
a valve shaft hermetically passing through said casing;
a valve ball within said valve chamber connected to said valve shaft within said casing;
an entrance-side ring valve seat between said casing and said valve ball on the entrance side of said ball valve; and
an exit-side ring valve seat between said casing and said valve ball on the exit side of said ball valve, wherein said exit-side ring valve seat comprises a through hole passing through said exit-side ring valve seat between said valve ball and said discharge orifice in said casing;
said valve ball comprising:
a circulation hole through the valve ball, wherein said entrance in said casing is connected and disconnected to said exit in said casing by rotate-operating said valve shaft and said valve ball;
a first passage hole between said circulation hole and said entrance when said valve ball is positioned in a first disconnection state wherein said valve ball disconnects said entrance from said exit; and
a second passage hole between said circulation hole and said through hole in said exit-side ring valve seat when said valve ball is positioned in said first disconnection state.

2. The ball valve according to claim 1, wherein said first passage hole is at a right angle to said circulation hole in said valve ball.

3. The ball valve according to claim 2, wherein the central axis of said first passage passes through the center of said ball valve.

4. The ball valve according to claim 1, wherein said second passage hole is at a 45-degree angle to said circulation hole in said valve ball and the central axis of said second passage hole passes through the center of the valve ball.

5. The ball valve according to claim 4, wherein said through hole is parallel to a center line of said entrance and said exit.

6. The ball valve according to claim 1, wherein said first passage hole and said second passage hole are repositioned when said valve ball is rotated to a second disconnection state 180 degrees from said first disconnection state, said first passage hole repositioned between said circulation hole and said exit, and said second passage hole is disconnected from said through hole in said exit-side ring valve seat.

7. The ball valve according to claim 1, said valve ball further comprising a third passage hole between said circulation hole and said through hole in said exit-side ring valve seat when said valve ball is rotated to a second disconnection state 180 degrees from said first disconnection state.

8. The ball valve according to claim 7, wherein said first passage hole and said second passage hole are repositioned when said valve ball is rotated to said second disconnection state, said first passage hole repositioned between said circulation hole and said exit, and said second passage hole is disconnected from said through hole in said exit-side ring valve seat; and
wherein said third passage hole is disconnected from said through hole in said exit-side ring valve seat when said ball valve is in said first disconnection state.

9. The ball valve according to claim 8, wherein said first passage hole is at a right angle to said circulation hole in said valve ball.

10. The ball valve according to claim 9, wherein the central axis of said first passage passes through the center of said ball valve.

11. The ball valve according to claim 8, wherein each of said second passage hole and said third passage hole is at a 45-degree angle to said circulation hole in said valve ball and the central axis of said second passage hole and of said third passage hole pass through the center of the valve ball.

12. The ball valve according to claim 11, wherein said through hole is parallel to a center line of said entrance and said exit.

13. A ball valve comprising:
a casing comprising an entrance, a valve chamber, an exit and a discharge orifice, wherein said discharge orifice communicates with ambient air when said ball valve is installed in a piping system;
a valve shaft hermetically passing through said casing;
a valve ball within said valve chamber connected to said valve shaft within said casing;

an entrance-side ring valve seat between said casing and said valve ball on the entrance side of said ball valve; and an exit-side ring valve seat between said casing and said valve ball on the exit side of said ball valve, wherein said exit-side ring valve seat comprises a through hole passing through said exit-side ring valve seat between said valve ball and said discharge orifice in said casing;

said valve ball comprising:
- a circulation hole through the valve ball, wherein said entrance in said casing is connected and disconnected to said exit in said casing by rotate-operating said valve shaft and said valve ball;
- a first passage hole between said circulation hole and said entrance when said valve ball is positioned in a first disconnection state wherein said valve ball disconnects said entrance from said exit; and
- a third passage hole between said circulation hole and said through hole in said exit-side ring valve seat when said valve ball is repositioned to second disconnection state 180 degrees from said first disconnection state;

wherein said first passage hole is between said circulation hole and said exit when said valve shaft and valve ball are in said second disconnected state.

14. The ball valve according to claim 13, wherein said first passage hole is at a right angle to said circulation hole in said valve ball.

15. The ball valve according to claim 14, wherein the central axis of said first passage passes through the center of said ball valve.

16. The ball valve according to claim 13, wherein said third passage hole is at a 45-degree angle to said circulation hole in said valve ball and the central axis of said third passage hole passes through the center of the valve ball.

17. The ball valve according to claim 16, wherein said through hole is parallel to a center line of said entrance and said exit.

* * * * *